(12) United States Patent
Ihara

(10) Patent No.: US 11,745,189 B2
(45) Date of Patent: Sep. 5, 2023

(54) NANOCARBON SEPARATION DEVICE AND NANOCARBON SEPARATION METHOD

(71) Applicant: NEC CORPORATION, Tokyo (JP)

(72) Inventor: Kazuki Ihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 554 days.

(21) Appl. No.: 16/758,548

(22) PCT Filed: Oct. 26, 2017

(86) PCT No.: PCT/JP2017/038727
§ 371 (c)(1),
(2) Date: Apr. 23, 2020

(87) PCT Pub. No.: WO2019/082337
PCT Pub. Date: May 2, 2019

(65) Prior Publication Data
US 2020/0346223 A1 Nov. 5, 2020

(51) Int. Cl.
*B03C 5/02* (2006.01)
*C01B 32/172* (2017.01)
*C01B 32/174* (2017.01)
*B82Y 40/00* (2011.01)

(52) U.S. Cl.
CPC .............. *B03C 5/02* (2013.01); *C01B 32/172* (2017.08); *C01B 32/174* (2017.08); *B03C 2201/24* (2013.01); *B82Y 40/00* (2013.01)

(58) Field of Classification Search
CPC .. B01D 57/02; B03C 5/00; B03C 5/02; C01B 32/15; C01B 32/172; C01B 2202/22
USPC .......................................... 204/450; 423/461
See application file for complete search history.

(56) References Cited

U.S. PATENT DOCUMENTS

2010/0044227 A1* 2/2010 Kim .................. B03C 5/005
204/450
2012/0103809 A1 5/2012 Ihara et al.

FOREIGN PATENT DOCUMENTS

| JP | H08-178897 A | 7/1996 |
| JP | H10-104153 A | 4/1998 |
| JP | 2000-310615 A | 11/2000 |
| JP | 2008-155150 A | 7/2008 |
| JP | 2011-168417 A | 9/2011 |
| JP | 2017-001919 A | 1/2017 |
| WO | 2010/150808 A1 | 12/2010 |

(Continued)

OTHER PUBLICATIONS

International Search Report for PCT/JP2017/038727 dated Jan. 9, 2018 [PCT/ISA/210].

(Continued)

*Primary Examiner* — Tri V Nguyen
(74) *Attorney, Agent, or Firm* — Sughrue Mion, PLLC

(57) ABSTRACT

A nanocarbon separation device includes a separation tank that is configured to accommodate a dispersion liquid including nanocarbons, a first electrode provided at an upper part in the separation tank, a second electrode provided at a lower part in the separation tank, an evaluation unit that is configured to evaluate a physical state or a chemical state of the dispersion liquid, and a determination unit that is configured to determine a separation state between metallic nanocarbons and semiconducting nanocarbons included in the dispersion liquid from the physical state or the chemical state.

9 Claims, 21 Drawing Sheets

(56) References Cited

FOREIGN PATENT DOCUMENTS

WO      WO-2011102322 A1 *   8/2011    ............. B03C 5/026

OTHER PUBLICATIONS

JP Office Action for JP Application No. 2019-549774, dated Mar. 28, 2023 with English Translation.

* cited by examiner

NANOCARBON SEPARATION DEVICE AND NANOCARBON SEPARATION METHOD

CROSS REFERENCE TO RELATED APPLICATIONS

This application is a National Stage of International Application No. PCT/JP2017/038727 filed Oct. 26, 2017.

TECHNICAL FIELD

The present invention relates to a nanocarbon separation device and a nanocarbon separation method.

BACKGROUND ART

In recent years, it has been expected that carbon materials having a size in a nanometer range (hereinafter referred to as "nanocarbons") will be applied to various fields due to their mechanical properties, electrical properties, chemical properties, and the like.

In the case of nanocarbons, nanocarbons having different properties are simultaneously produced in a manufacturing stage to form a mixture in some cases. When nanocarbons having different electrical properties are used in an electronic material when mixed together, a problem such as deterioration in the characteristics thereof is likely to be caused. Thus, it is necessary to separate nanocarbons having desirable properties from the generated nanocarbon mixture.

In order to separate a nanocarbon mixture, Patent Document 1 describes a nanocarbon material separation method including a step of introducing a dispersion liquid including nanocarbon materials dispersed in nanocarbon micelle groups having a plurality of different charges and a holding solution having a specific gravity different from that of the nanocarbon materials into an electrophoresis tank by laminating the solutions and arranging them in a predetermined direction, and a step of separating the nanocarbon micelle groups into two or more nanocarbon groups by applying a voltage in a serial direction to the introduced, arranged, and laminated dispersion liquids and holding solution.

PRIOR ART DOCUMENTS

Patent Documents

[Patent Document 1] PCT International Publication No.. WO 2010/150808

SUMMARY OF THE INVENTION

Problem to be Solved by the Invention

However, the separation method described in Patent Document 1 had a problem in that a separation state could not be objectively determined. In addition, there was no way to visually determine an accurate end point of separation.

An object of the present invention is to provide a nanocarbon separation device and a nanocarbon separation method through which, in separation of a mixture of nanocarbons having different properties, a separation state can be objectively determined, an accurate end point of separation is determined, and separation with high accuracy is realized with favorable reproducibility. In addition, an object of the present invention is to provide a nanocarbon separation device and a nanocarbon separation method through which, in separation of a mixture of nanocarbons, a separation operation is automated using determination of an accurate end point of separation, and the work efficiency is improved.

Means for Solving the Problem

A nanocarbon separation device of the present invention includes a separation tank that is configured to accommodate a dispersion liquid including nanocarbons; a first electrode that is provided at an upper part in the separation tank; a second electrode that is provided at a lower part in the separation tank; an evaluation means that is configured to evaluate a physical state or a chemical state of the dispersion liquid; and a determination means that is configured to determine a separation state between metallic nanocarbons and semiconducting nanocarbons included in the dispersion liquid from the physical state or the chemical state.

A nanocarbon separation method of the present invention includes a step of injecting a dispersion liquid including nanocarbons into a separation tank; a step of separating the metallic nanocarbons and the semiconducting nanocarbons by applying a direct current voltage between a first electrode provided at an upper part in the separation tank and a second electrode provided at a lower part in the separation tank, to cause metallic nanocarbons included in the dispersion liquid to move toward the first electrode, and to cause semiconducting nanocarbons included in the dispersion liquid to move toward the second electrode; a step of evaluating a physical state or a chemical state of the dispersion liquid; and a step of determining a separation state of the metallic nanocarbons and the semiconducting nanocarbons from the physical state or the chemical state.

Effect of the Invention

According to the present invention, in separation of a mixture of nanocarbons having different properties, a separation state can be objectively determined, an accurate end point of separation can be determined, and separation with high accuracy can be realized with favorable reproducibility. In addition, according to the present invention, in separation of a mixture of nanocarbons, a separation operation can be automated using determination of an accurate end point of separation, and the work efficiency can be improved.

EMBODIMENTS FOR CARRYING OUT THE INVENTION

A nanocarbon separation device and a nanocarbon separation method according to example embodiments of the present invention will be described.

Here, the present example embodiment is described in detail to allow better understanding of the spirit of the present invention, and does not limit the present invention unless otherwise specified.

First Example Embodiment

Nanocarbon Separation Device

Figure 1:
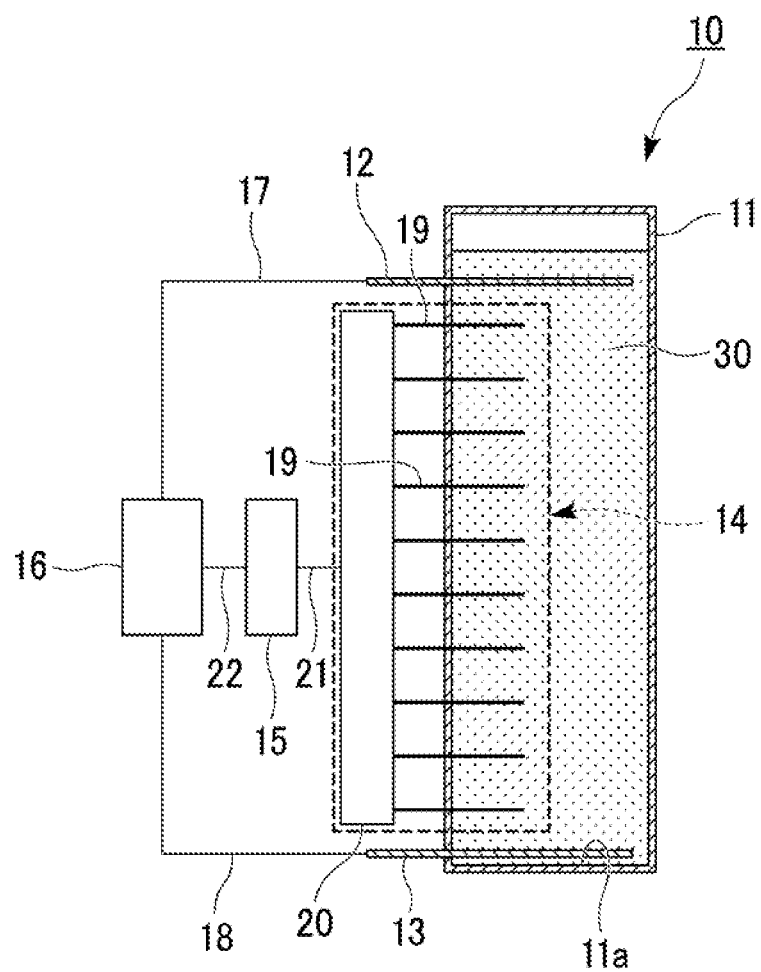
FIG. 1 is a schematic view showing a nanocarbon separation device of a first example embodiment.

FIG. 1 is a schematic view showing a nanocarbon separation device of the present example embodiment.

A nanocarbon separation device 10 of the present example embodiment includes a separation tank (electrophoresis tank) 11 in which a nanocarbon-containing dispersion liquid (hereinafter referred to as a "nanocarbon dispersion liquid") 30 is accommodated, a first electrode 12 provided at an upper part in the separation tank 11, a second electrode 13 provided at a lower part in the separation tank 11, an evaluation means 14 that evaluates a physical state or chemical state of the nanocarbon dispersion liquid 30, and a determination means 15 that determines a separation state between metallic nanocarbons and semiconducting nanocarbons contained in the nanocarbon dispersion liquid 30 from the physical state or chemical state of the nanocarbon dispersion liquid 30 evaluated by the evaluation means 14. In addition, the nanocarbon separation device 10 of the present example embodiment includes a direct current (DC) power supply 16 that applies a direct current voltage between the first electrode 12 and the second electrode 13. The direct current power supply 16 is a power supply unit for electrophoresis and is electrically connected to the first electrode 12 via a cable 17 and electrically connected to the second electrode 13 via a cable 18.

In the nanocarbon separation device 10 of the present example embodiment, the evaluation means 14 includes a plurality of evaluation electrodes 19 that are arranged at equal intervals in a height direction of the separation tank 11 and an potentiometer 20 that is electrically connected to the evaluation electrode 19 and measures a potential of the nanocarbon dispersion liquid 30 in each of the evaluation electrodes 19. In the nanocarbon separation device 10 of the present example embodiment, the evaluation means 14 measures a potential of the nanocarbon dispersion liquid 30.

The potentiometer 20 of the evaluation means 14 is electrically connected to the determination means 15 via a cable 21.

In addition, the determination means 15 is electrically connected to the direct current power supply 16 via a cable 22.

In the separation tank 11, the nanocarbon dispersion liquid 30 to be separated is accommodated, and nanocarbons dispersed in the accommodated nanocarbon dispersion liquid 30 are separated through carrier-free electrophoresis. The shape and size of the separation tank 11 are not particularly limited as long as the separation tank 11 can accommodate the nanocarbon dispersion liquid 30.

The separation tank 11 is a container having a hollow tube shape. The separation tank 11 has an opening at the upper end. The lower end of the separation tank 11 is closed and forms the bottom of the container.

The material of the separation tank 11 is not particularly limited as long as it is stable with respect to the nanocarbon dispersion liquid 30 and is an insulating material. Examples of materials of the separation tank 11 include glass, quartz, and acrylic resin.

The separation tank 11 may include an injection/recovery port (not shown) that communicates with an outer bottom surface of the separation tank 11 at the lower end. The injection/recovery port is used for injecting the nanocarbon dispersion liquid 30 into the separation tank 11 and recovering the nanocarbon dispersion liquid 30 from the separation tank 11. In addition, the injection/recovery port has a closed structure (not shown) such as a rotary cock having a ground glass joint.

In the nanocarbon separation device 10 of the present example embodiment, for example, the first electrode 12 is a negative electrode, and the second electrode 13 is a positive electrode. In this case, when a direct current voltage is applied to the first electrode 12 and the second electrode 13, the direction of the electric field is directed from the bottom of the separation tank 11 upward.

The first electrode 12 and the second electrode 13 are not particularly limited is long as they can be used for carrier-free electrophoresis and are stable with respect to the nanocarbon dispersion liquid 30. Examples of the first electrode 12 and the second electrode 13 include a platinum electrode.

The structures of the first electrode 12 and the second electrode 13 are not particularly limited, and in the separation tank 11, are appropriately selected according to the amount (volume) of the nanocarbon dispersion liquid 30 accommodated in the separation tank 11 or the like. The structure of the first electrode 12 is not particularly limited as lone as it is disposed at an upper part of the evaluation electrode 19 and is disposed in a wide region of the upper end of the evaluation electrode 19 in the separation tank 11.

The structure of the second electrode 13 is not particularly limited as long as it is disposed at a lower part in the evaluation electrode 19 and is disposed to extend over a wide region of the lower end of the evaluation electrode 19 in the separation tank 11. Examples of structures of the first electrode 12 and the second electrode 13 include an annular shape, a disk shape, and a rod shape in a plan view of the separation tank 11. In addition, examples of structures of the first electrode 12 and the second electrode 13 include a porous plate shape in which a plurality of fine pores are uniformly provided.

The evaluation electrode 19 of the evaluation means 14 is not particularly limited as long as it can be used for carrier-free electrophoresis and is stable with respect to the nanocarbon dispersion liquid 30. Examples of the evaluation electrode 19 include a platinum electrode.

The structure of the evaluation electrode 19 is not particularly limited as long as it is a structure that does not restrict movement of metallic nanocarbons and semiconducting nanocarbons contained in the nanocarbon dispersion liquid 30 in the separation tank 11 and is in contact with the nanocarbon dispersion liquid 30.

The interval at which the plurality of evaluation electrodes 19 are arranged is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the evaluation electrodes 19 can be arranged only therearound. For example, when an end point of separation is determined based on the physical state or chemical state of the nanocarbon dispersion liquid 30 collected on the lower side of the separation tank 11 after separation, the evaluation electrodes 19 may be arranged on the lower side of the separation tank 11.

The potentiometer 20 of the evaluation means 14 is not particularly limed as long as it can measure a potential at each evaluation electrode 19. In addition, the potentiometer 20 can convert a result of the potential measured in each evaluation electrode 19 into an electrical signal, and output it to the determination means 15.

The determination means 15 receives an electrical signal related to the potential measured by the potentiometer 20 which is transmitted from the evaluation means 14, and determines a separation state between metallic nanocarbons and semiconducting nanocarbons contained in the nanocarbon dispersion liquid 30. The determination means 15 determines a separation state between metallic nanocarbons and semiconducting nanocarbons based on the electrical signal related to the potential measured by the potentiometer 20. In addition, for example, when a point at which the gradient of the potential changes greatly is equal to or lower than a predetermined measurement position, the determination means 15 determines that separation of metallic nanocarbons and semiconducting nanocarbons has been completed.

When the determination means 15 determines that separation of metallic nanocarbons and semiconducting nanocarbons has been completed, an electrical signal for instructing application of a direct current voltage to be stopped is transmitted to the direct current power supply 16 and application of a direct current voltage between the first electrode 12 and the second electrode 13 is stopped.

In addition, in a nanocarbon separation method using the nanocarbon separation device 10 to be described below, when a temperature gradient occurs in the separation tank 11, a convection phenomenon of the nanocarbon dispersion liquid 30 may occur in the separation tank 11. As a result, it is not possible to stably separate metallic nanocarbons and semiconducting nanocarbons contained in the nanocarbon dispersion liquid 30. Here, the nanocarbon separation device 10 preferably includes a temperature-adjusting means for keeping the temperature of the nanocarbon dispersion liquid 30 in the separation tank 11 constant. The temperature-adjusting means is not particularly limited as long as it can keep the temperature of a liquid accommodated in a container constant, and, for example, any means such as mounting a water-cooling jacket can be used.

While a case in which the first electrode 12 is a negative electrode and the second electrode 13 is a positive electrode has been provided as an exemplary example of the nanocarbon separation device 10 of the present example embodiment, the nanocarbon separation device 10 of the present example embodiment is not limited thereto. In the nanocarbon separation device 10 of the present example embodiment, the first electrode 12 may be a positive electrode and the second electrode 13 may be a negative electrode.

According to the nanocarbon separation device 10 of the present example embodiment, the evaluation means 14 including the evaluation electrode 19 and the potentiometer 20 which measures a potential of the nanocarbon dispersion liquid 30 is provided between the first electrode 12 and the second electrode 13 in the separation tank 11. In addition, when the determination means 15 is provided, a separation state between metallic nanocarbons and semiconducting nanocarbons contained in the nanocarbon dispersion liquid 30 is determined. As a result, in a step of separating nanocarbons to be described below, without depending on a method of visually confirming a separation state or a voltage application time tar electrophoresis, separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Figure 2:
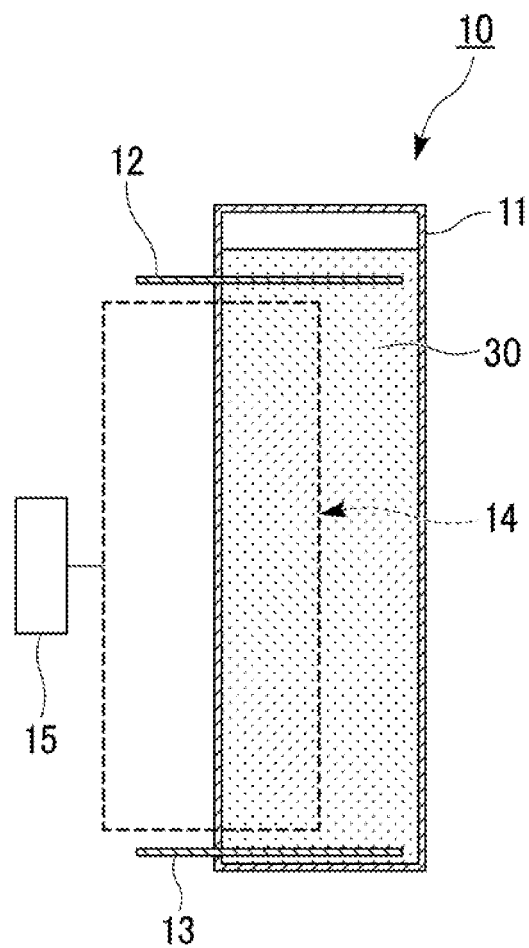
FIG. 2 is a schematic view showing a minimum configuration of the nanocarbon separation device of the present invention.

Here, FIG. 2 is a schematic view showing a minimum configuration of the nanocarbon separation device of the present invention.

Nanocarbon Separation Method

A nanocarbon separation method using the nanocarbon separation device 10 will be described and also operations of the nanocarbon separation device 10 will be described with reference to FIG. 1 to FIG. 4.

Figure 4:
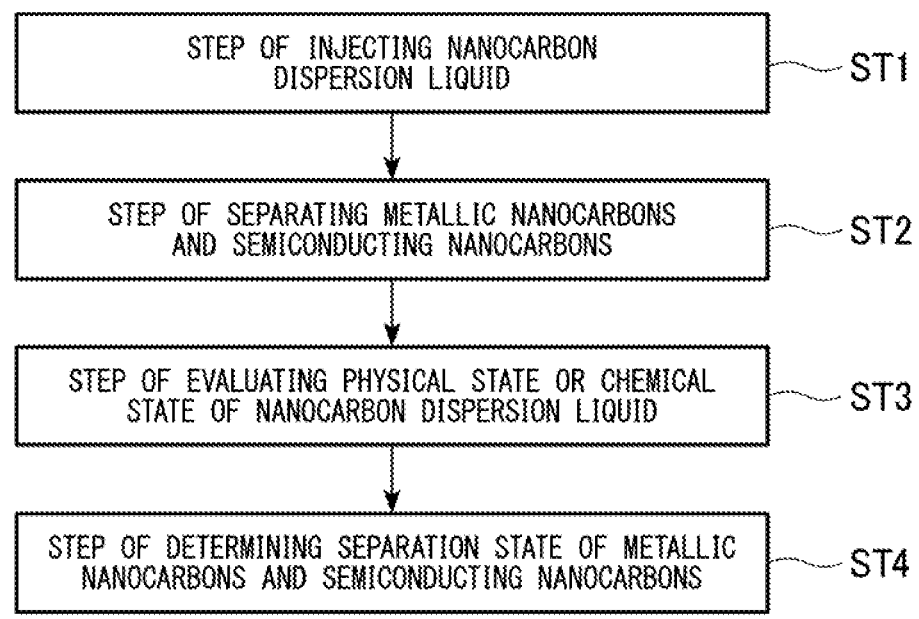
FIG. 4 is a flowchart showing the nanocarbon separation method of the present invention.

FIG. 4 is a flowchart showing the nanocarbon separation method of the present invention.

The nanocarbon separation method of the present example embodiment includes a step of injecting the nanocarbon dispersion liquid. 30 into the separation tank 11 (hereinafter referred to as an "injection step"), a step in which a direct current voltage is applied between the first electrode 12 provided at an upper part the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of determining a separation state between metallic nanocarbons and semiconducting nanocarbons contained in the nanocarbon dispersion liquid 30 from the physical state or chemical state of the nanocarbon dispersion liquid 30 (hereinafter referred to as a "determination step").

In addition, the nanocarbon separation method of the present example embodiment may include a step of recovering metallic nanocarbons and semiconducting nanocarbons contained in the nanocarbon dispersion liquid (hereinafter referred to as a "recovery step") after the separation step.

In the nanocarbon separation method of the present example embodiment, the nanocarbon refers to a carbon material mainly composed of carbon such as single-walled carbon nanotubes, double-walled carbon nanotubes, multi-walled carbon nanotubes, carbon nanohorns, carbon nanotwists, graphene, fullerene, and the like. In the nanocarbon separation method of the present example embodiment, a case in which semiconducting single-walled carbon nanotubes and metallic single-walled carbon nanotubes are separated from a dispersion liquid in which single-walled carbon nanotubes as nanocarbons are dispersed will be described in detail.

It is known that single-walled carbon nanotubes are divided into a metallic type and a semiconducting type with two different properties according to the diameter of the tube and a winding configuration. When single-walled carbon nanotubes are synthesized using a conventional production method, a mixture of single-walled carbon nanotubes including metallic single-walled carbon nanotubes having metallic properties and semiconducting single-walled carbon nanotubes having semiconducting properties at a statistical ratio of 1:2 is obtained.

The mixture of single-walled carbon nanotubes is not particularly limited as long as it contains metallic single-walled carbon nanotubes and semiconducting single-walled carbon nanotubes. In addition, the single-walled carbon nanotubes in the present example embodiment may be single-walled carbon nanotubes alone or single-walled carbon nanotubes in which some of carbon atoms are substituted with an arbitrary functional group or single-walled carbon nanotubes that are modified with an arbitrary functional group.

First, a single-walled carbon nanotube dispersion liquid in which a mixture of single-walled carbon nanotubes is dispersed in a dispersion medium together with a surfactant is prepared.

The dispersion medium is not particularly limited as long as it allows the mixture of single-walled carbon nanotubes to be dispersed. Examples of dispersion mediums include water, heavy water, an organic solvent, and an ionic liquid. Among these dispersion mediums, water or heavy water is suitably used because single-walled carbon nanotubes do not deteriorate therein.

Regarding the surfactant, a non-ionic surfactant, a cationic surfactant, an anionic surfactant and the like are used. A non-ionic surfactant is preferably used in order to prevent ionic impurities such as sodium ions from being mixed into single-walled carbon nanotubes.

Regarding the non-ionic surfactant, a non-ionic surfactant having a non-ionizable hydrophilic moiety and a hydrophobic moiety such as an alkyl chain is used. Examples of such a non-ionic surfactant include a non-ionic surfactant having a polyethylene glycol structure represented by a polyoxyethylene alkyl ether type.

Regarding such a non-ionic surfactant, a polyoxyethylene alkyl ether represented by the following Formula (1) is suitably used.

$$C_nH_{2n}(OCH_2CH_2)_mOH \qquad (1)$$

(here, n=12 to 18, m=20 to 100)

Examples of a polyoxyethylene alkyl ether represented by Formula (1) include polyoxyethylene (23) lauryl ether (product name: Brij L23, commercially available from Sigma-Aldrich), polyoxyethylene (20) cetyl ether (product name: Brij C20, commercially available from Sigma-Aldrich), polyoxyethylene (20) stearyl ether (product name: Brij S20, commercially available from Sigma-Aldrich), polyoxyethylene (20) oleyl ether (product name: Brij O20, commercially available from Sigma-Aldrich), and polyoxyethylene (100) stearyl ether (product name: Brij S100, commercially available from Sigma-Aldrich).

Regarding the non-ionic surfactant, polyoxyethylene sorbitan monostearate (molecular formula: $C_{64}H_{126}O_{26}$, product name: Tween 60, commercially available from Sigma-Aldrich), polyoxyethylene sorbitan trioleate (molecular formula: $C_{24}H_{44}O_6$, product name: Tween 85, commercially available from Sigma-Aldrich), octylphenol ethoxylate (molecular formula: $C_{14}H_{22}O(C_2H_4O)_n$, n=1 to 10, product name: Triton X-100, commercially available from Sigma-Aldrich), polyoxyethylene (40 isooctyl phenyl ether (molecular formula: $C_8H_{17}C_6H_{40}(CH_2CH_{20})_{40}H$, product name: Triton X-405, commercially available from Sigma-Aldrich), poloxamer (molecular formula: $C_5H_{10}O_2$, product name: Pluronic, commercially available from Sigma-Aldrich), and polyvinyl pyrrolidone (molecular formula: $(C_6H_9NO)_n$, n=5 to 100 commercially available from Sigma-Aldrich) or the like can be used.

The amount of the non-ionic surfactant in the single-walled carbon nanotube dispersion liquid is preferably 0.1 wt % or more and 5 wt % or less and more preferably 0.5 wt % or more and 2 wt % or less.

When the amount of the non-ionic surfactant is 5 wt % or less, the viscosity of the single-walled carbon nanotube dispersion liquid does not become too high, and metallic single-walled carbon nanotubes and semiconducting single-walled carbon nanotubes contained in the single-walled carbon nanotube dispersion liquid can be easily separated through carrier-free electrophoresis.

The amount of single-walled carbon nanotubes in the single-walled carbon nanotube dispersion liquid is preferably 1 μg/mL or more and 100 μg/mL or less and more preferably 5 μg/mL, or more and 40 μg/mL or less.

When the amount of single-walled carbon nanotubes is within the above range, metallic single-walled carbon nanotubes and semiconducting single-walled carbon nanotubes contained in the single-walled carbon nanotube dispersion liquid can be easily separated through carrier-free electrophoresis.

A method of preparing a single-walled carbon nanotube dispersion liquid is not particularly limited, and a known method is used. For example, a method in which a mixed solution of a dispersion medium containing a mixture of single-walled carbon nanotubes and a surfactant is subjected to an ultrasonic treatment and the mixture of single-walled carbon nanotubes is dispersed in the dispersion medium is an exemplary example. According to this ultrasonic treatment, the aggregated metallic single-walled carbon nanotubes and semiconducting single-walled carbon nanotubes are sufficiently separated and in the nanocarbon dispersion liquid, metallic single-walled carbon nanotubes and semiconducting single-walled carbon nanotubes are uniformly dispersed in the dispersion medium. Thereby, metallic single-walled carbon nanotubes and semiconducting single-walled carbon nanotubes are easily separated through carrier-free electrophoresis to be described below. Here, metallic single-walled carbon nanotubes and semiconducting single-walled carbon nanotubes that are not dispersed according to an ultrasonic treatment are preferably removed by separation through ultracentrifugation.

Next, in the injection step, the single-walled carbon nanotube dispersion liquid is injected into the separation tank 11.

In addition, when the single-walled carbon nanotube dispersion liquid is injected into the separation tank 11, the first electrode 12 and the second electrode 13 are brought into contact with the single-walled carbon nanotube dispersion liquid.

Next, when a direct current voltage is applied to the first electrode 12 and the second electrode 13 for a predetermined time (for example, 1 hour to 100 hours), an electric field is formed in the separation tank 11. Specifically, the electric field is formed so that the direction of the electric field is directed from the bottom of the separation tank 11 upward. Due to an electrophoretic force generated by the electric field and the charge of single-walled carbon nanotubes, metallic single-walled carbon nanotubes contained in the single-walled carbon nanotube dispersion liquid move toward the first electrode 12, and semiconducting single-walled carbon nanotubes move toward the second electrode 13. As described above, the mixture is separated into metallic single-willed carbon nanotubes and semiconducting single-walled carbon nanotubes through carrier-free electrophoresis.

Figure 3:
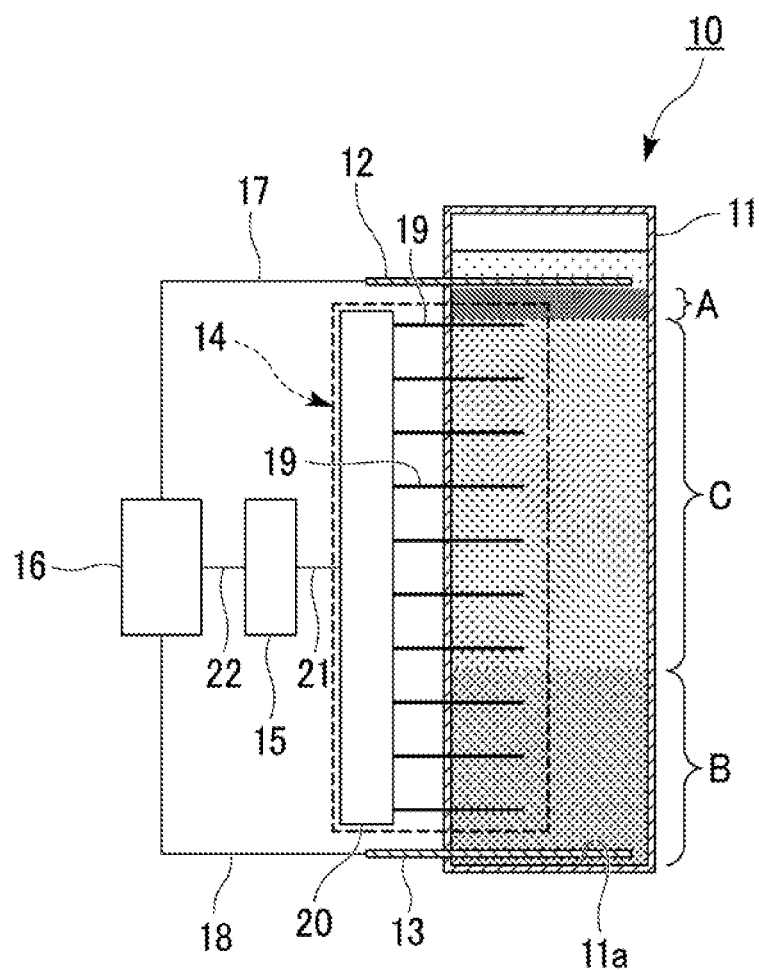
FIG. 3 is a schematic view showing a nanocarbon separation method of the first example embodiment.

Based on the result of carrier-free electrophoresis, as shown in FIG. 3, the phase of the single-walled carbon nanotube dispersion liquid is separated into three phases including a dispersion liquid phase having a relatively large amount of metallic single-walled carbon nanotubes (hereinafter referred to as a "dispersion liquid phase A"), a dispersion liquid phase having a relatively large amount of semiconducting single-walled carbon nanotubes (hereinafter referred to as a "dispersion liquid phase B"), and a dispersion liquid phase which is formed between the dispersion liquid phase A and the dispersion liquid phase B and has a relatively small amount of metallic single-walled carbon nanotubes and semiconducting single-walled carbon nanotubes (hereinafter referred to as a "dispersion liquid phase C"), In the present example embodiment, the dispersion liquid phase A is formed on the side of the first electrode 12, and the dispersion liquid phase B is formed on the side of the second electrode 13.

A direct current voltage applied to the first electrode 12 and the second electrode 13 is not particularly limited, and is appropriately adjusted according to a distance between the first electrode 12 and the second electrode 13, the amount of the mixture of single-walled carbon nanotubes in the single-walled carbon nanotube dispersion liquid, or the like.

When water or heavy water is used as the dispersion medium of the single-walled carbon nanotube dispersion liquid, a direct current voltage applied to the first electrode 12 and the second electrode 13 has any value that is larger than 0 V and equal to or less than 1,000 V.

In addition, when a direct current voltage is applied to the first electrode 12 and the second electrode 13, the electric field between the first electrode 12 and the second electrode 13 is preferably 0.5 V/cm or more and 15 V/cm or less and more preferably 1 V/cm or more and 10 V/cm or less.

In the separation step, the temperature of the single-walled carbon nanotube dispersion liquid accommodated in the separation tank 11 is not particularly limited as long as it is a temperature at which the dispersion medium of the single-walled carbon nanotube dispersion liquid does not deteriorate or evaporate.

Next, in the evaluation step, a physical state or chemical state of the single-walled carbon nanotube dispersion liquid is evaluated.

In the nanocarbon separation method of the present example embodiment, using the evaluation means 14 including the plurality of evaluation electrodes 19 that are arranged at equal intervals in the height direction of the separation tank 11, and the potentiometer 20 that is electrically connected to the evaluation electrode 19 and measures a potential at each of the evaluation electrodes 19, a potential at each of the evaluation, electrodes 19 is measured. The potential gradient of the single-walled carbon nanotube dispersion liquid changes according to the progress of separation of metallic single-walled carbon nanotubes and semiconducting single-walled carbon nanotubes. Therefore, it is possible to evaluate a separation state of the single-walled carbon nanotube dispersion liquid from the potential gradient during carrier-free electrophoresis.

Next, in the determination step, the determination means 15 determines a separation state of metallic single-walled carbon nanotubes and semiconducting single-walled carbon nanotubes contained in the single-walled carbon nanotube dispersion liquid from the potential gradient obtained in the evaluation step. In the determination step, for example, a point at which the potential gradient changes greatly is equal to or lower than a predetermined measurement position, that is, a time at which the dispersion liquid phase B having a large amount of semiconducting single-walled carbon nanotubes is sufficiently concentrated, is determined as an end point of separation of metallic nanocarbons and semiconducting nanocarbons.

In the determination step, when it is determined that separation of metallic single-walled carbon nanotubes and semiconducting single-walled carbon nanotubes has been completed, application of a direct current voltage between the first electrode 12 and the second electrode 13 from the direct current power supply 16 is stopped.

Here, the evaluation step and the determination step may be performed simultaneously with the separation step. When the steps are performed simultaneously, it is possible to accurately determine an end point of separation of the metallic single-walled carbon nanotubes and semiconducting single-walled carbon nanotubes contained in the single-walled carbon nanotube dispersion liquid in real time, which is more efficient.

Next, in the recovery step, metallic single-walled carbon nanotubes and semiconducting single-walled carbon nanotubes contained in the single-walled carbon nanotube dispersion liquid are recovered. That is, the separated dispersion liquid phase A and dispersion liquid phase B are recovered (fractionated) from the separation rank 11.

The recovery method is not particularly limited, and any method in which the dispersion liquid phase A and the dispersion liquid phase B are not mixed by diffusion may be used.

Examples of recovery methods include a method in which application of a direct current voltage to the first electrode 12 and the second electrode 13 is stopped and a small amount is gently removed from each phase with a pipette.

In addition, regarding the recovery method, a method in which a recovery port that communicates with an outer bottom surface of the separation tank 11 is provided at a lower end of the separation tank 11, and a single-walled carbon nanotube dispersion liquid is gently recovered using, for example, a peristaltic pump, through the recovery port is an exemplary example. Thereby, during recovery, it is not necessary to move the recovery port according to the change in liquid level, and the recovery operation can be performed without disturbing a liquid phase interface in the separation tank 11. In addition, when the capacity of the separation tank 11 is increased, there is no need to prepare a long recovery nozzle, which is very reasonable.

The recovered single-walled carbon nanotube dispersion liquid is accommodated again in the separation tank 11, the operation of separating metallic single-walled carbon nanotubes and semiconducting single-walled carbon nanotubes contained in the single-walled carbon nanotube dispersion liquid through carrier-free electrophoresis is repeatedly performed in the same manner as described above, and thus it is possible to obtain highly pure metallic single-walled carbon nanotubes and semiconducting single-walled carbon nanotubes.

According to the nanocarbon separation method using the nanocarbon separation device 10 of the present example embodiment, without depending on a method of visually confirming that a dispersion liquid phase has been formed or a time for which a direct current voltage is applied between a pair of electrodes, according to the potential gradient of the single-walled carbon nanotube dispersion liquid, a separation state of the single-walled carbon nanotube dispersion liquid can be objectively determined and an accurate end point of separation can be determined, and separation with high accuracy can be realized with favorable reproducibility. In addition, the separation operation can be automated using determination of an accurate end point of separation and the work efficiency can be improved.

Here, while a case in which the mixture of single-walled carbon nanotubes is separated into metallic single-walled carbon nanotubes and semiconducting single-walled carbon nanotubes has been provided as an exemplary example of the nanocarbon separation method of the present example embodiment, the nanocarbon separation method of the present example embodiment is not limited thereto. In the nanocarbon separation method of the present example embodiment, for example, a single-walled carbon nanotube purifying method in which the mixture is separated into metallic single-walled carbon nanotubes and semiconducting single-walled carbon nanotubes in the separation tank 11, and only single-walled carbon nanotubes having desired properties are then recovered may be performed.

Working Example 1

While the present invention will be described below in more detail with reference to working examples, the present invention is not limited to the following working examples.
"Preparation of Single-Walled Carbon Nanotube Dispersion"

A solution AA in which 1.0 mass % of polyoxyethylene (100) stearyl ether (product name: Brij S100, commercially available from Sigma-Aldrich) as a non-ionic surfactant was dissolved in heavy water was prepared.

A mixture of single-walled carbon nanotubes (enhanced direct injection pyrolytic synthesis eDIPS) single-walled carbon nanotubes, average diameter: 1.0 nm) was monodispersed in the solution AA.

The heavy water in which the mixture of single-walled carbon nanotubes was monodispersed was subjected to an ultrasonic dispersion treatment using a horn type ultrasonic crusher (product name: Digital Sonifier 450, commercially available from Branson) at an output of 40 W for 20 minutes. Then, an ultracentrifugation operation was performed using an ultracentrifuge (product name: CS 100GX, commercially available from Hitachi Koki Co., Ltd.) at 250,000×g, 10° C. for 1 hour. Then, 50% of the supernatant was obtained as a dispersion liquid of a mixture of single-walled carbon nanotubes.

Next, the solution A was added to the dispersion liquid of a mixture of single-walled carbon nanotubes, and a single-walled carbon nanotube dispersion liquid containing an amount of 10 μg/mL of single-walled carbon nanotubes and an amount of 1.0 wt % of polyoxyethylene (100) stearyl ether was obtained.

"Injection of Single-Walled Carbon Nanotube Dispersion Liquid"

The single-walled carbon nanotube dispersion liquid prepared as described above was injected into the separation tank 11 of the nanocarbon separation device 10 shown in FIG. 1.

In the separation tank 11, nine evaluation electrodes 19 were arranged in the height direction at intervals of 1 cm. A distance between the uppermost first electrode 12 (negative electrode) and the second electrode 13 (positive electrode) was set to 10 cm.

"Separation Operation"

A direct current voltage of 60 V was applied to the first electrode 12 (negative electrode) and the second electrode 13 (positive electrode) of the nanocarbon separation device 10.

"Evaluation"

Immediately after the voltage was applied, 6 hours after voltage application started and 100 hours after voltage application started, absolute values of relative potentials of the respective evaluation electrodes 19 and the uppermost first electrode 12 (negative electrode) with respect to the lowermost second electrode 13 (positive electrode) were measured by the potentiometer 20.

Figure 5:
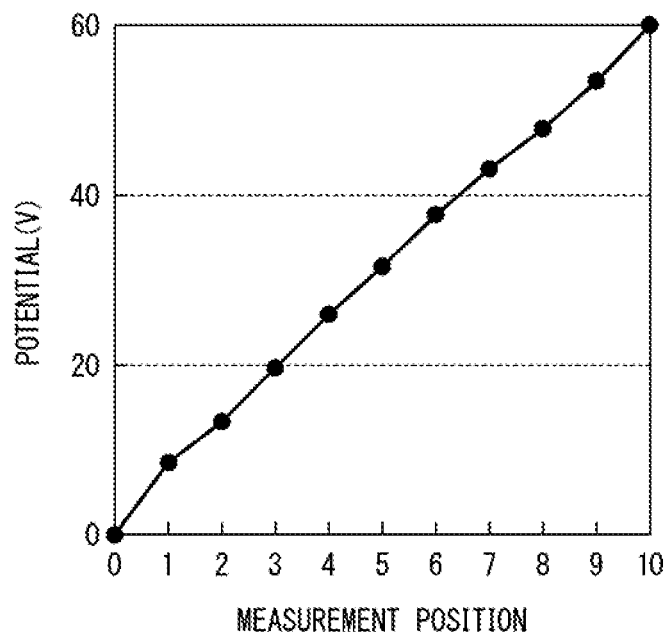
FIG. 5 is a diagram showing evaluation results of a potential of a single-walled carbon nanotube dispersion liquid in working example 1.

FIG. 5 shows the measured value of the potential of the single-walled carbon nanotube dispersion liquid immediately after the voltage was applied. The vertical axis represents an absolute value of a relative potential with respect to the second electrode 13 (positive electrode) and the horizontal axis represents the electrode position. The electrode 0 indicates the lowermost second electrode 13 (positive electrode), the electrode 10 indicates the uppermost first electrode 12 (negative electrode), and 1 to 9 indicate respective evaluation electrodes 19, and the electrodes are located higher in the separation tank 11 as the number increases. The potential of the electrode 10 is 60 V, the voltage is applied, since the dispersion liquid is uniform, a potential gradient in the separation tank ills uniform, and the relationship between the measurement position and the potential is almost linear as shown in FIG. 5.

Figure 6:
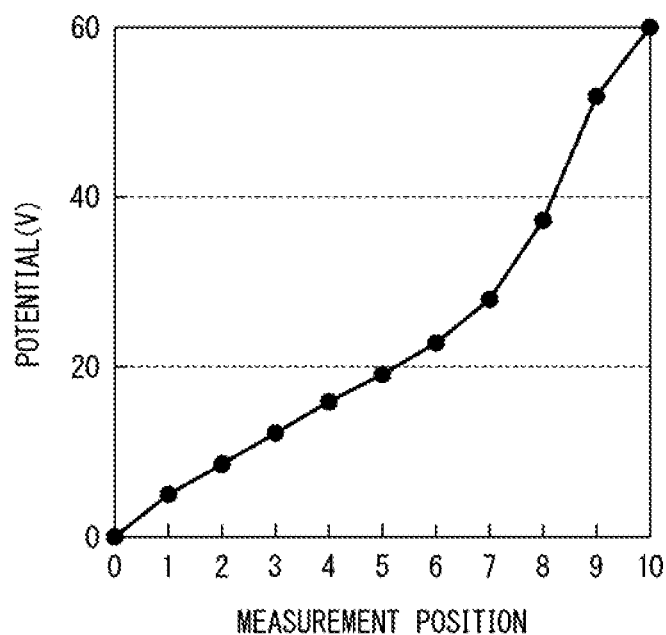
FIG. 6 is a diagram showing evaluation results of a potential of the single-walled carbon nanotube dispersion liquid in working example 1.

FIG. 6 shows the measurement results after 6 hours. After 6 hours, separation has progressed. Due to an electrophoretic force, the metallic single-walled carbon nanotubes contained in the single-walled carbon nanotube dispersion liquid have moved toward the first electrode 12 and the semiconducting single-walled carbon nanotubes have moved toward the second electrode 13. After 6 hours, an interface between the dispersion liquid phase B having a large amount of semiconducting single-walled carbon nanotubes and the dispersion liquid phase C having a relatively small amount of single-walled carbon nanotubes was near the electrode position 7. In FIG. 6, it can be understood that the potential gradient changed at the electrode position 7. The potential gradient is large in the part of the separation tank 11 above the electrode position 7, and the potential gradient is small in the part of the separation tank 11 below the electrode position 7. That is, it can be understood that the potential gradient is smaller in the dispersion liquid phase 13 having a large amount of semiconducting single-walled carbon nanotubes in the separation tank 11 than other parts.

Figure 7:
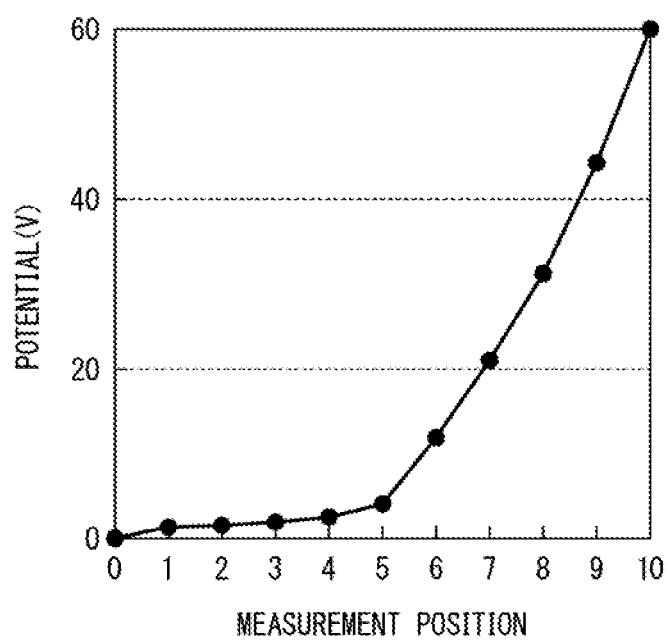
FIG. 7 is a diagram showing evaluation results of a potential of the single-walled carbon nanotube dispersion liquid in working example 1.

FIG. 7 shows the measurement results after 100 hours. After 100 hours, the separation has further progressed. In FIG. 7, almost no potential gradient is observed below the electrode position 5. In this case, semiconducting single-walled carbon nanotubes are collected below the electrode position 5 in the separation tank 11. Accordingly, it could be clearly understood that, when a plurality of potential evaluation electrodes 19 were provided in the separation tank 11, and the dependence of the potential on the position was measured, it was possible to detect a separation state without visually observing the separation tank 11.

For example, if a time point at which the dispersion liquid phase B having a large amount of semiconducting single-walled carbon nanotubes is positioned below the electrode position 5 is set as an end point of separation, when a point at which the potential gradient changes greatly as shown in FIG. 7 has been the electrode position 5, voltage application during electrophoresis may be stopped. This end point position can be changed according to a desired degree of separation. It the purity of semiconducting single-walled carbon nanotubes required for separation is not so high, for example, as shown in FIG. 6, separation may be stopped when the potential gradient changes at the electrode position 7. In addition, when highly pure semiconducting single-walled. carbon nanotubes are required, the separation operation is additionally continued, and separation may be stopped when the potential gradient changes in the part further below the separation tank 11 such as the electrode position 4 or 3.

Here, in the evaluation step and the determination step, the separation step may be performed at the same time. When the steps are performed at the same time, it is possible to accurately determine an end point of separation of metallic single-walled carbon nanotubes and semiconducting single-walled carbon nanotubes contained in the single-walled carbon nanotube dispersion liquid in real time, which is efficient.

According to the nanocarbon separation method using the nanocarbon separation device 10 of this working example, the evaluation means 14 including the evaluation electrode 19 and the potentiometer 20 which measure a potential of the nanocarbon dispersion liquid 30 is provided between the first electrode 12 and the second electrode 13 in the separation tank 11. In addition, when the determination means 15 is provided, a separation state between metallic nanocarbons and semiconducting nanocarbons contained in the nanocarbon dispersion liquid 30 is determined. As a result, without depending on a method of visually confirming that a dispersion liquid phase has been formed or a time for which a direct current voltage is applied between a pair of electrodes, according to the potential gradient of the single-walled carbon nanotube dispersion liquid, a separation state of the single-walled carbon nanotube dispersion liquid can be objectively determined and an accurate end point of separation can be determined, and separation with high accuracy can be realized with favorable reproducibility. In addition, the separation operation can be automated using determination of an accurate end point of separation and the work efficiency can be improved.

Second Example Embodiment

Nanocarbon Separation Device

Figure 8:
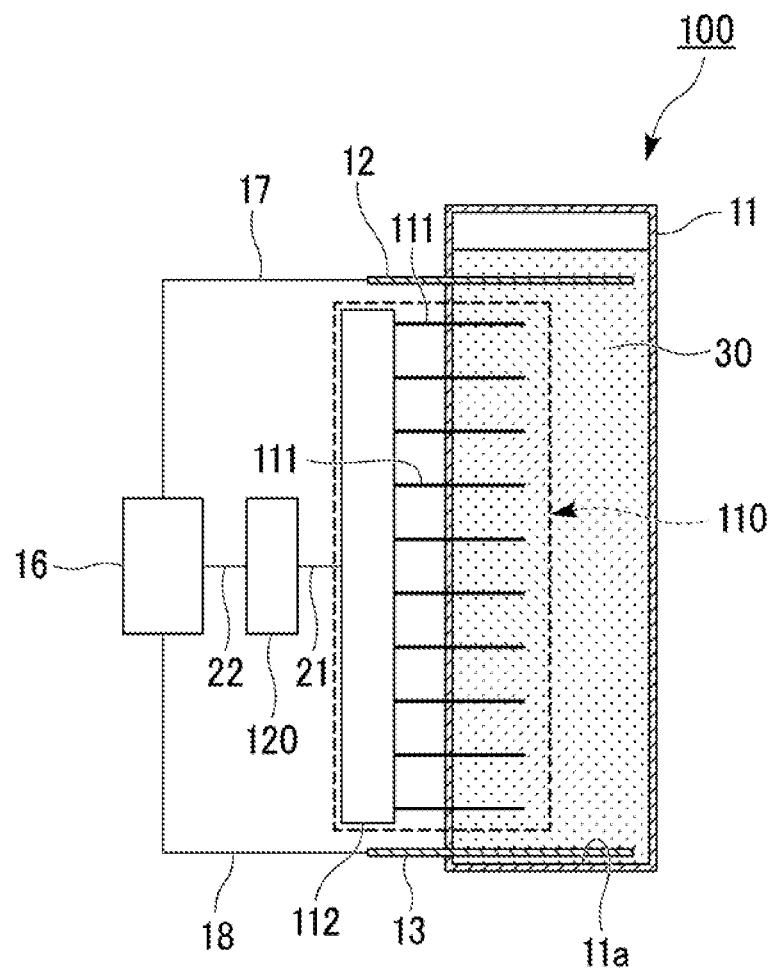
FIG. 8 is a schematic view showing a nanocarbon separation device of a second example embodiment.

FIG. 8 is a schematic view showing a nanocarbon separation device of the present example embodiment. Here, in FIG. 8, components the same as those of the nanocarbon separation device of the first example embodiment shown in FIG. 1 will be denoted with the same reference numerals and redundant descriptions will be omitted.

In the nanocarbon separation device 100 of the present example embodiment, an evaluation means 110 includes a plurality of pH sensors 111 that are arranged at equal intervals in the height direction of the separation tank 11 and a pH meter 112 that is electrically connected to the pH sensor 111 and measures a pH of the nanocarbon dispersion liquid 30 in each pH sensor 111, The pH meter 112 of the evaluation means 110 is not particularly limited as long as the pH is measured in each pH sensor 111.

In addition, the pH meter 112 of the evaluation means 110 is electrically connected to a determination means 120 via the cable 21. The pH meter 112 can convert a result of the pH measured in each pH sensor 111 into an electrical signal and output it to the determination means 120.

The pH meter 112 of the evaluation means 110 is electrically connected to the determination means 120 via the cable 21.

In addition, the determination means 120 is electrically connected to the direct current power supply 16 via the cable 22.

The pH sensor 111 of the evaluation means 110 is not particularly limited as long as it can be used for carrier-free electrophoresis and is stable with respect to the nanocarbon dispersion liquid 30. Examples of pH sensors 111 include those that are generally used for measuring a pH of a solution.

The interval at which the plurality of pH sensors 111 are arranged is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the pH sensors 111 can be arranged only thereabound. For example, when an end point of separation is determined based on the physical state or chemical state of the nanocarbon dispersion liquid 30 collected on the lower side of the separation tank 11 after separation, the pH sensors 111 may be arranged on the lower side of the separation tank 11.

Figure 9:
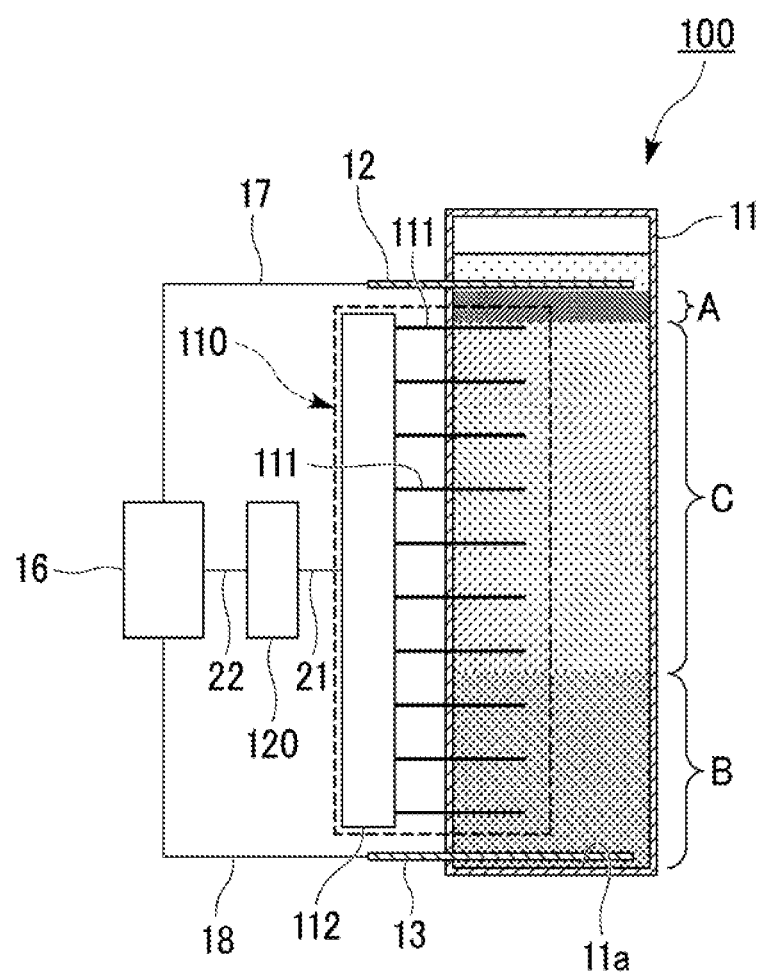
FIG. 9 is a schematic view showing a nanocarbon separation method of the second example embodiment.

As shown in FIG. 9, when a direct current voltage is applied to the first electrode 12 and the second electrode 13 while the single-walled carbon nanotube dispersion liquid is accommodated in the separation tank 11, metallic single-wailed carbon nanotubes are collected on the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount of metallic single-walled carbon nanotubes and semiconducting single-walled carbon nanotubes is formed between the dispersion liquid phase A and the dispersion liquid phase B.

The determination means 120 receives an electrical signal related to the pH measured by the pH meter 112 transmitted from the evaluation means 110, and determines a separation state between metallic nanocarbons and semiconducting nanocarbons contained in the nanocarbon dispersion liquid 30.

When a direct current voltage is applied to the first electrode 12 and the second electrode 13 while the single-walled carbon nanotube dispersion liquid is accommodated in the separation tank 11, a pH gradient is formed in the separation tank 11. A region with a pH of 6 to 7 is formed on the side of the first electrode 12 (negative electrode) (the dispersion liquid phase A) on which metallic single-walled carbon nanotubes are collected and a region with a pH of 4 to 5 is formed on the side of the second electrode 13 (positive electrode) (the dispersion liquid phase B) on which semiconducting single-walled carbon nanotubes are collected.

Therefore, the region with a pH of 4 to 5 is a region (the dispersion liquid phase B) in which semiconducting single-walled carbon nanotubes are collected. When the pH is measured, the region (the dispersion liquid phase B) in which semiconducting single-walled carbon nanotubes are collected is detected, and the determination means 120 determines a time point at which the region (the dispersion liquid phase B) in which semiconducting single-walled carbon nanotubes are collected is sufficiently concentrated as an end point of separation.

When the determination means 120 determines that separation of metallic single-walled carbon nanotubes and semiconducting single-walled carbon nanotubes has been completed, application of a direct current voltage between the first electrode 12 and the second electrode 13 from the direct current power supply is stopped.

While a case in which the first electrode 12 is a negative electrode and the second electrode 13 is a positive electrode has been provided as an exemplary example of the nanocarbon separation device 100 of the present example embodiment, the nanocarbon separation device 100 of the present example embodiment is not limited thereto. In the nanocarbon separation device 100 of the present example embodiment, the first electrode 12 may be a positive electrode and the second electrode 13 may be a negative electrode.

According to the nanocarbon separation device 100 of the present example embodiment, the evaluation means 110 including, the pH sensor 111 and the pH meter 112 which measure a pH of the nanocarbon dispersion liquid 30 is provided between the first electrode 12 and the second electrode 13 in the separation tank 11. In addition, when the determination means 15 is provided, a separation state between metallic nanocarbons and semiconducting nanocarbons contained in the nanocarbon dispersion liquid 30 is determined. As a result, in a step of separating nanocarbons to be described below, without depending on a method of visually confirming a separation state or a voltage application time for electrophoresis, a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Nanocarbon Separation Method

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of determining a separation state between metallic nanocarbons and semiconducting nanocarbons contained in the nanocarbon dispersion liquid 30 from the physical state or chemical state of the nanocarbon dispersion liquid 30 (hereinafter referred to as a "determination step").

In addition, the nanocarbon separation method of the present example embodiment may include a step of recovering metallic nanocarbons and semiconducting nanocarbons contained in the nanocarbon dispersion liquid (hereinafter referred to as a "recovery step") after the separation step.

Working Example 2

While the present invention will be described below in more detail with reference to working examples, the present invention is not limited to the following working examples.
"Preparation of Single-Walled Carbon Nanotube Dispersion"

In the same manner as in working example 1, a single-walled carbon nanotube dispersion liquid containing an amount of 10 μg/mL of single-walled carbon nanotubes having an average diameter of 1.0 nm and an amount of 1.0 wt % of polyoxyethylene (100) stearyl ether was prepared.
"Injection of Single-Walled Carbon Nanotube Dispersion Liquid"

In the same manner as in working example 1, the single-walled carbon nanotube dispersion liquid prepared as described above was injected into the separation tank 11 of the nanocarbon separation device 10 shown in FIG. 8.

In the nanocarbon separation method of this working example, fifteen pH sensors 111 were arranged in the height direction in the separation tank 11.
"Separation Operation"

In the same manner as in working example 1, a direct current voltage of 120 V was applied between the first electrode 12 (negative electrode) and the second electrode 13 (positive electrode) of the nanocarbon separation device 10.
"Evaluation"

Figure 10:
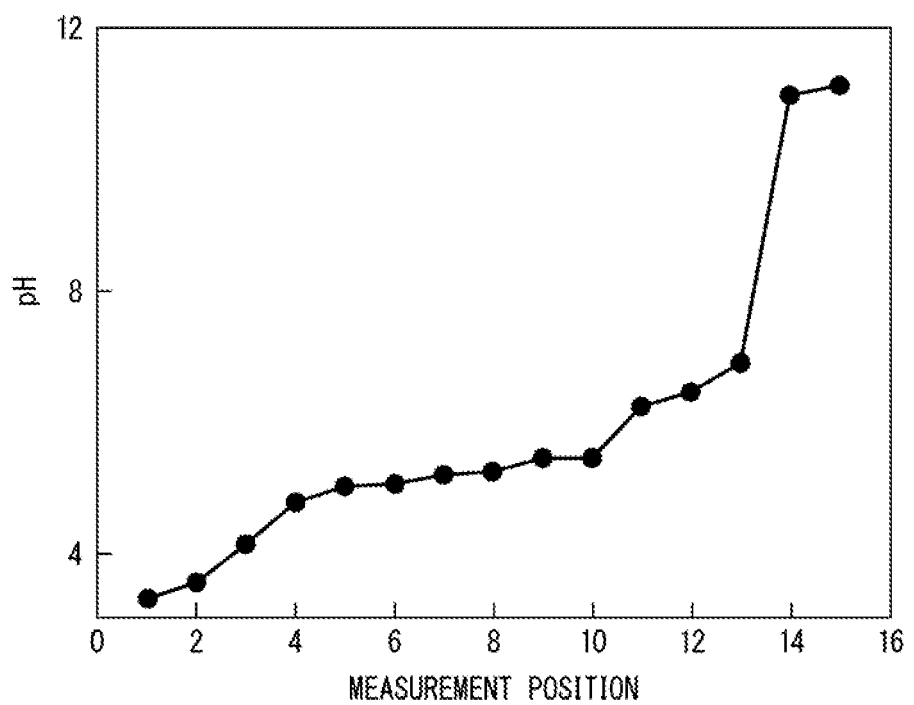
FIG. 10 is a diagram showing pH evaluation results of a single-walled carbon nanotube dispersion liquid in working example 2.

FIG. 10 shows the measurement results of pH 100 hours after the voltage was applied. The vertical axis represents the measured pH, and the horizontal axis represents the position of the pH sensor. The measurement position 1 is the value measured at the lowermost pH sensor 111, the measurement position 15 is the value measured at the uppermost pH sensor 111, and the pH sensors are located higher in the separation tank 11 as the number increases.

When a direct current voltage is applied to the first electrode 2 and the second electrode 13, a pH gradient is formed in the separation tank 11. In FIG. 10, a region with a pH of 5 or less is formed below the pH sensor position 4 (the dispersion liquid phase B) on the side of the second electrode 13 (positive electrode) on which semiconducting single-walled carbon nanotubes are collected. A region with a pH of 6 to 7 is formed in a region (the dispersion liquid phase A) of the pH sensor positions 11 to 13 the side of the first electrode 12 (negative electrode) on which metallic single-walled carbon nanotube are collected.

Therefore, it can be understood that, when the pH is measured, it is possible to detect a region (the dispersion liquid phase B) in which semiconducting single walled carbon nanotubes are collected. As a result, a time point at which a region with a pH of 5 or less, that is, a region (the dispersion liquid phase B) in which semiconducting single-walled carbon nanotubes are collected is sufficiently concentrated is set as an end point of separation.

In the determination step, when it is determined that separation of metallic single-walled carbon nanotubes and semiconducting single-walled carbon nanotubes has been completed, application of a direct current voltage between the first electrode 12 and the second electrode 13 from the direct current power supply 16 is stopped.

In the state shown in FIG. 10, it can be understood that a region (the dispersion liquid phase B) in which semiconducting single-walled carbon nanotubes are collected is concentrated below the pH sensor 4. In this manner, when the plurality of pH sensors 111 are provided in the separation tank 11 and the dependence of the pH on the position is measured, it is possible to detect a separation state without visually observing the separation tank 11. For example, a time point at which the dispersion liquid phase B having a large amount of semiconducting single-walled carbon nanotubes was below the pH sensor 4 was set as an end point of separation, and when a point at which the pH was 5 or less as shown in FIG. 10 was the pH sensor position 5, voltage application during electrophoresis was stopped. This end point position is able to be changed according to a desired degree of separation as in the case of measuring the potential in working example 1.

Here, the evaluation step and the determination step may be perforated simultaneously with the separation step. When the steps are performed simultaneously, it is possible to accurately determine an end point of separation of the metallic single-walled carbon nanotubes and semiconducting single-walled carbon nanotubes contained in the single-walled carton nanotube dispersion liquid in real time, which is more efficient.

According to the nanocarbon separation device 100 of the present example embodiment, the evaluation means 110 including the pH sensor 111 and the pH meter 112 which measure a pH of the nanocarbon dispersion liquid 30 is provided between the first electrode 12 and the second electrode 13 in the separation tank 11. In addition, when the do termination means 120 is provided, a separation state between metallic nanocarbons and semiconducting nanocarbons contained in the nanocarbon dispersion liquid 30 is determined. As a result, in a step of separating nanocarbons, without depending on a method of visually confirming a separation state or a voltage application time for electrophoresis, separation state of the nanocarbon dispersion liquid 30 can be objectively determined, an accurate endpoint of separation can be determined, and separation with high accuracy can be realized with favorable reproducibility. In addition, the separation operation can be automated using determination of an accurate end point of separation and the work efficiency can be improved.

Third Example Embodiment

Nanocarbon Separation Device

Figure 11:
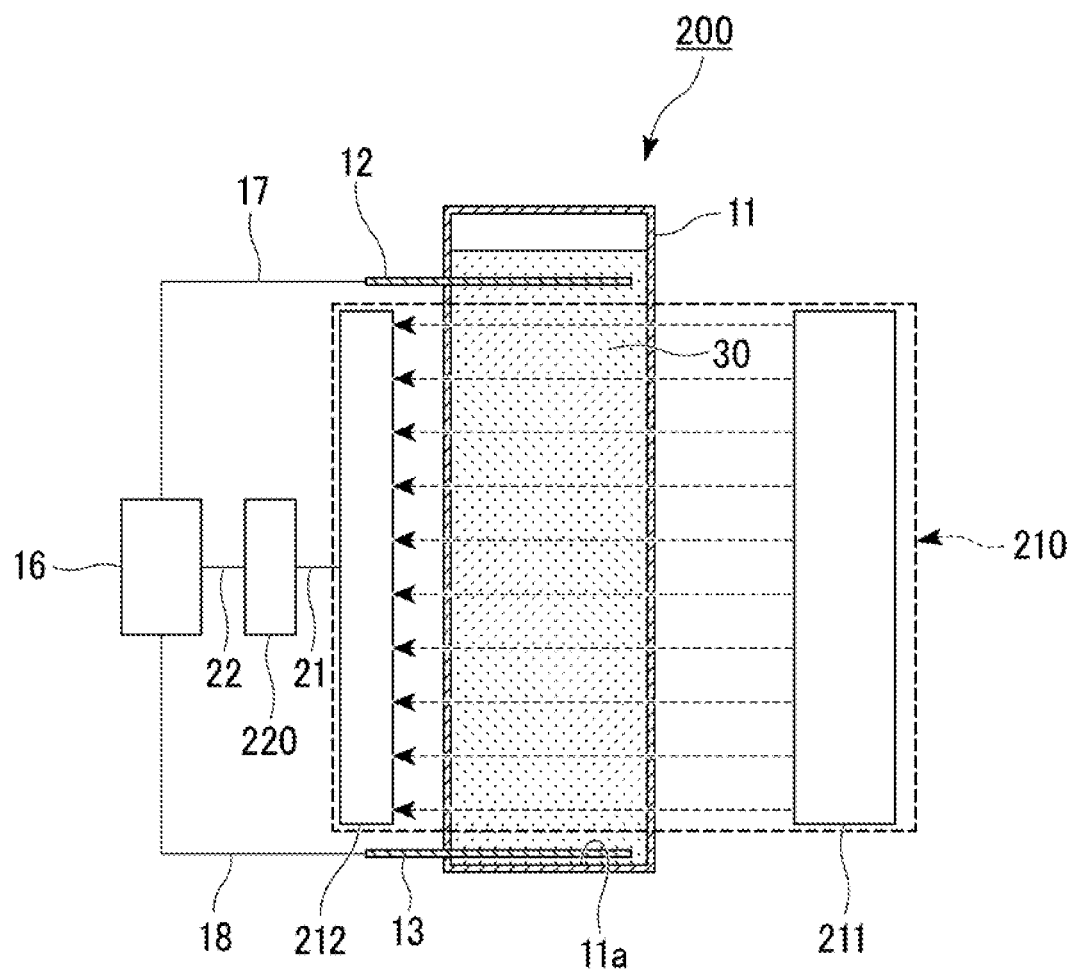
FIG. 11 is a schematic view showing a nanocarbon separation device of a third example embodiment.

FIG. 11 is a schematic view showing a nanocarbon separation device of the present example embodiment. Here, in FIG. 11, components the same as those of the nanocarbon separation device of the first example embodiment shown in FIG. 1 will be denoted with the same reference numerals and redundant descriptions will be omitted.

In a nanocarbon separation device 200 of the present example embodiment, an evaluation means 210 evaluates the absorbance of the nanocarbon dispersion liquid 30 accommodated in the separation tank 11.

The evaluation means 210 includes a light source 211 that emits (irradiates) light to the nanocarbon dispersion liquid 30 accommodated in the separation tank 11 and a detector 212 including a plurality of detecting units that are arranged at equal intervals in the height direction of the separation tank 11. The detecting units of the detector 212 receive light that is emitted front the light source 211 and has passed through the nanocarbon dispersion liquid 30 accommodated in the separation tank 11. The evaluation means 210 measures the absorbance of the nanocarbon dispersion liquid 30 from the amount of light emitted from the light source 211 to the nanocarbon dispersion liquid 30 and the amount of light received by the detecting units of the detector 212.

The detector 212 of the evaluation means 210 is electrically connected to a determination means 220 via the cable 21.

In addition, the determination means 220 is electrically connected to the direct current power supply 16 via the cable 22.

Regarding the light source 211 of the evaluation means 210, for example, a light source that emits visible light with a wavelength of 200 nm to 800 nm is used.

Examples of detectors 212 of the evaluation means 210 include those that are generally used for measuring the absorbance of a solution. In addition, the detector 212 can convert a result of the absorbance measured in each detecting unit into an electrical signal and output it to the determination means 220.

The interval at which the plurality of detecting units are arranged in the detector 212 is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the detecting units of the detector 212 can be arranged only therearound. For example, when an end point of separation is determined based on the physical state or chemical state of the nanocarbon dispersion liquid 30 collected on the lower side of the separation. tank 11 after separation, the detecting units of the detector 212 may be arranged on the lower side of the separation tank 11.

Figure 12:
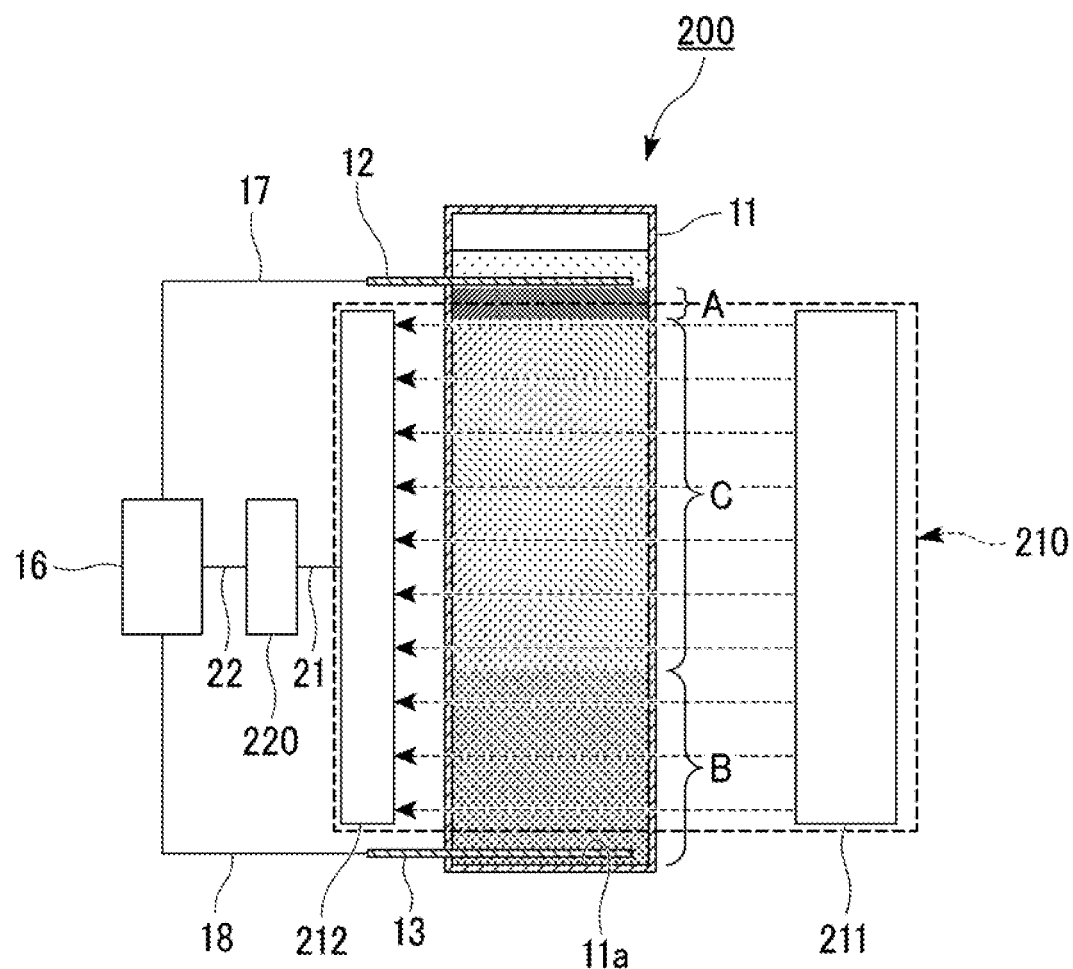
FIG. 12 is a schematic view showing a nanocarbon separation method of the third example embodiment.

As shown in FIG. 12, when a direct current voltage is applied to the first electrode 12 and the second electrode 13 while the single-walled carbon nanotube dispersion liquid is accommodated in the separation tank 11, metallic single-walled carbon nanotubes are collected on the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount of metallic single-walled carbon nanotubes and semiconducting single-walled carbon nanotubes is formed between the dispersion liquid phase A and the dispersion liquid phase B.

The determination means 220 receives the electrical signal related to the absorbance measured by the detector 212, which is transmitted from the evaluation means 210, and determines a separation state between metallic nanocarbons and semiconducting nanocarbons contained in the nanocarbon dispersion liquid 30. When a point at which the amount of change in absorbance changes greatly is equal to or lower than a predetermined measurement position, the determination means 220 determines that separation of metallic nanocarbons and semiconducting nanocarbons has been completed. When the determination means 220 determines that separation of metallic nanocarbons and semiconducting nanocarbons has been completed, application of a direct current voltage between the first electrode 12 and the second electrode 13 from the direct current power supply 16 is stopped. That is, the determination means 220 transmits an electrical signal for instructing application of a direct current voltage to be stopped to the direct current power supply 16.

While a case in which the first electrode 12 is a negative electrode and the second electrode 13 is a positive electrode has been provided as an exemplary example of the nanocarbon separation device 200 of the present example embodiment, the nanocarbon separation device 200 of the present example embodiment is not limited thereto. In the nanocarbon separation device 200 of the present example embodiment, the first electrode 12 may be a positive electrode and the second electrode 13 may be a negative electrode.

According to the nanocarbon separation device 200 of the present example embodiment, when the evaluation means 110 including the detector 212 that measures the absorbance of the nanocarbon dispersion liquid 30 is provided between the first electrode 12 and the second electrode 13 in the separation tank 11, and the determination means 220 that determines a separation state between metallic nanocarbons and semiconducting nanocarbons contained in the nanocarbon dispersion liquid 30 are provided, for example, in a step of separating nanocarbons to be described below, without depending on a method of visually confirming that a dispersion liquid phase has been formed or a time for which a direct current voltage is applied between a pair of electrodes, according to the absorbance of the nanocarbon dispersion liquid 30, a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Nanocarbon Separation Method

The nanocarbon separation method of the present example embodiment includes a step of injecting the nanocarbon dispersion liquid 30 into the separation tank 11 (hereinafter referred to as an "injection step"), a step in which a direct current voltage is applied between the first, electrode 12 provided at an upper part in the separation tank 11 and the second electrode 13 provided at a lower part in the separation tank 11, metallic, nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of determining a separation state between metallic nanocarbons and semiconducting nanocarbons contained in the nanocarbon dispersion liquid 30 from the, physical state or chemical state of the nanocarbon dispersion liquid 30 (hereinafter referred to as a "determination step").

Working Example 3

While the present invention will be described below in more detail with reference to working examples, the present invention is not limited to the following working examples.
"Preparation of Single-Walled Carbon Nanotube Dispersion"

In the same manner as in working example 1, a single-walled carbon nanotube dispersion liquid containing an amount of 10 μg/ml, of single-walled carbon nanotubes having an average diameter of 1.0 nm synthesized by the eDIPS method and an amount of 1.0 wt % of polyoxyethylene (100) stearyl ether was prepared.
"Injection of Single-Walled Carbon Nanotube Dispersion Liquid"

In the same manner as in working example 1, the single-walled carbon nanotube dispersion liquid prepared as described above was injected into the separation tank 11 of the nanocarbon separation device 10 shown in FIG. 11.

In the nanocarbon separation method of this working example, using the evaluation means 210 including the light source 211 that emits light to the single-walled carbon nanotube dispersion liquid accommodated in the separation tank 11 and the detector 212 including a plurality of detecting units arranged at equal intervals in the height direction of the separation tank 11, the absorbance at each detecting unit provided in the detector 212 is measured, and the absorbance of the single walled carbon nanotube dispersion liquid is evaluated. The absorbance was evaluated at 15 positions in the height direction in the separation tank 11.

In absorbance evaluation, the absorbances at a wavelength of 310 nm, which was less dependent on the diameter of single-walled carbon nanotubes, a wavelength of 649 nm, which was specific to semiconducting single-walled carbon nanotubes, and a wavelength of 503 nm, which was specific to metallic single-walled carbon nanotubes, were measured. In addition, the ratio of the absorbances at 649 nm and 501 nm was simply calculated as an index indicating the ratio of the semiconducting single-walled carbon nanotubes and the metallic single-walled carbon nanotubes.
"Separation Operation"

In the same manner as in working example 1, a direct current voltage of 120 V was applied between the first electrode 12 (negative electrode) and the second electrode 13 (positive electrode) of the nanocarbon separation device 10.
"Evaluation"

Figure 13:
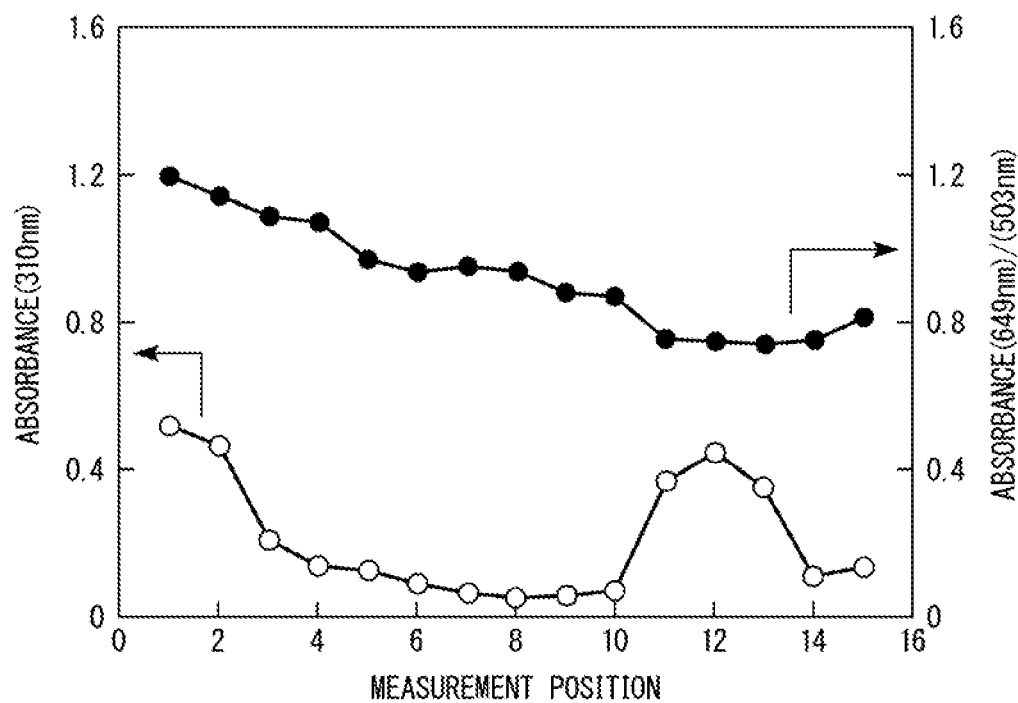
FIG. 13 is a diagram showing evaluation results of an absorbance distribution of a single-walled carbon nanotube dispersion liquid in working example 3.

FIG. 13 shows the measurement results of the absorbance 100 hours after the voltage was applied. The left vertical axis represents the measured 310 nm, and relates to the concentration of single-walled carbon nanotubes in the separation layer 11. The right vertical axis represents a ratio of the absorbances at 649 nm and 503 nm. A higher ratio of 649 nm/503 nm indicates a higher purity of semiconducting single-walled carbon nanotubes. The horizontal axis represents the measurement position of the absorbance. The measurement position 1 is the value measured at the lowermost part, the measurement position 15 is the value measured at the uppermost part, and the parts are located higher in the separation tank 11 as the number increases.

Since the absorbance at 310 nm indicating, the concentration single-walled carbon nanotubes increases at the measurement position 1 to 3 and the measurement positions 11 to 13 in FIG. 13, it can be understood that the mixture: of single-walled carbon nanotubes is separated into two regions through electrophoresis. In addition, it can be understood that, at the measurement positions 1 to 4, the ratio of 649 nm/503 nm is high and semiconducting single-walled carbon nanotubes with high purity (the dispersion liquid phase B) are concentrated. On the other hand, it can be understood that, at the measurement positions 11 to 13, the ratio of 649 nm/503 nm is low and the purity of metallic single-walled carbon nanotubes is high (the dispersion liquid phase A). Accordingly, when the absorbance is measured, it is possible to detect a separation of semiconducting single-wailed carbon nanotubes and metallic single walled carbon nanotubes.

Therefore, it can be understood that, when the absorbance measured, it is possible to detect a region (the dispersion liquid phase B) in which semiconducting single-walled carbon nanotube are collected and a region (the dispersion liquid phase A) in which metallic single-walled carbon nanotubes are collected. As a result, a time point at which the region in which the absorbance at 310 nm was high and the ratio of 649 nm/503 nm was high, that is, the region (the dispersion liquid phase A) in which semiconducting single-walled carbon nanotubes were collected was sufficiently concentrated, was set as an end point of separation.

In the determination step, when it is determined that separation of metallic single-walled carbon nanotubes and semiconducting single-walled carbon nanotubes has been completed, application of a direct current voltage between the first electrode 12 and the second electrode 13 from the direct current power supply 16 is stopped.

In the state shown in FIG. 13, it can be understood that the region (the dispersion liquid phase B) in which semiconducting single-walled carbon nanotubes are collected is concentrated below the measured value 3. Accordingly, it could be clearly understood that, when the absorbance was measured at a plurality of measurement positions in the separation tank 11, it was possible to detect a separation state without visually observing the separation tank 11. For example, when a time point at which the dispersion liquid phase B having a large amount of semiconducting single-walled carbon nanotubes is below the measurement position 3 is set as an end point of separation, voltage application during, electrophoresis is stopped when the region in which the absorbance at 310 nm is high and the ratio of 649 nm/503 nm is high as shown in FIG. 13 is the measurement position 3 or lower. This end point position is able to be changed according to a desired degree of separation as in the case of measuring the potential in working example 1.

Here, in the evaluation step and the determination step, the separation step may be performed at the same time. When the steps are performed at the same time, it is possible to accurately determine an end point of separation of metallic single-walled carbon nanotubes and semiconducting single-walled carbon nanotubes contained in the single-walled carbon nanotube dispersion liquid in real time, which is more efficient.

According to the nanocarbon separation device 100 of the present example embodiment, the evaluation means 210 that measures the absorbance of the nanocarbon dispersion liquid 30 is provided at a plurality of positions in the separation tank 11. In addition, when the determination means 220 is provided, a separation state between metallic nanocarbons and semiconducting nanocarbons contained in the nanocarbon dispersion liquid 30 is determined. As a result, in a step of separating nanocarbons, without depending on a method of visually confirming a separation state or a voltage application time for electrophoresis a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Fourth Example Embodiment

Nanocarbon Separation Device

Figure 14:
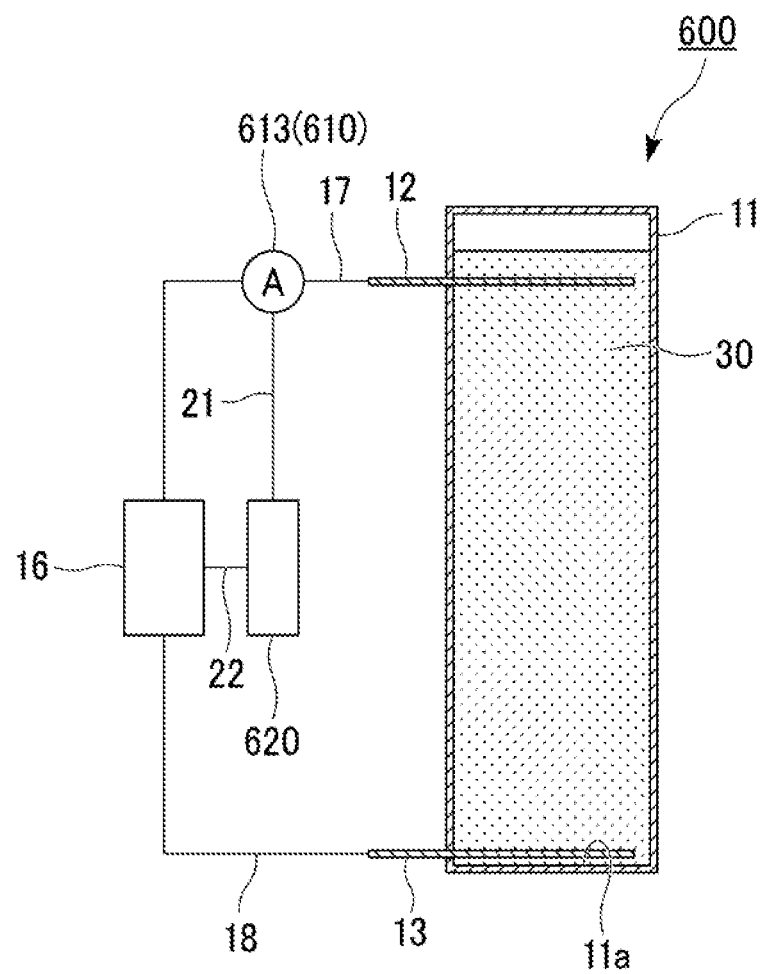
FIG. 14 is a schematic view showing a nanocarbon separation device of a fourth example embodiment.

FIG. 14 is a schematic view showing a nanocarbon separation device of the present example embodiment. Here, in FIG. 14, components the same as those of the nanocarbon separation device of the first example embodiment shown in FIG. 1 will be denoted with the same reference numerals and redundant descriptions will be omitted.

A nanocarbon separation device 600 of the present: example embodiment includes the separation tank 11, the first electrode 12 provided at an upper part in the separation tank 11, the second electrode 13 provided at a lower part in the separation tank 11, and the direct current power supply 16 that applies a direct current voltage between the first electrode 12 and the second electrode 13. The direct current power supply 16 is electrically connected to the first electrode 12 via the cable 17 and is electrically connected to the second electrode 13 via the cable 18. An amperemeter 613 that measures a current that flows between the first electrode 12 and the second electrode 13 is provided midway along the cable 17 or the cable 18, and can measure a current that flows between the first electrode 12 and the second electrode 13. An evaluation means 610 of the present example embodiment measures a current that flows between the first electrode 12 and the second electrode 13 using the amperemeter 613. In addition, a determination means 620 that determines a separation state between metallic nanocarbons and semiconducting nanocarbons contained in the nanocarbon dispersion liquid 30 from a value of a current that flows between the first electrode 12 and the second electrode 13 is included.

In the nanocarbon separation device 600 of the present example embodiment, the evaluation means 610 includes the amperemeter 613 that measures a current during electrophoresis, which flows through the first electrode 12 and the second electrode 13, in the separation tank 11.

The amperemeter 613 of the evaluation means 610 is electrically connected to the determination means 620 via the cable 21.

In addition, the determination means 620 is electrically connected to the direct current power supply 16 via the cable 22.

The amperemeter 613 of the evaluation means 610 is not particularly limited as long, as it can measure a value of a current that flows through the first electrode 12 and the second electrode 13. In addition, the amperemeter 613 can convert a measurement result of a current value between a first evaluation electrode 611 and a second evaluation electrode 612 into an electrical signal, and output it to the determination means 620.

Here, the same effects can be obtained using, for example, a source measuring unit including a high-accuracy amperemeter therein (product example, 2400 Source Meter, commercially available from Keithley) as the direct current power supply 16 in place of installing the amperemeter 613.

Figure 15:
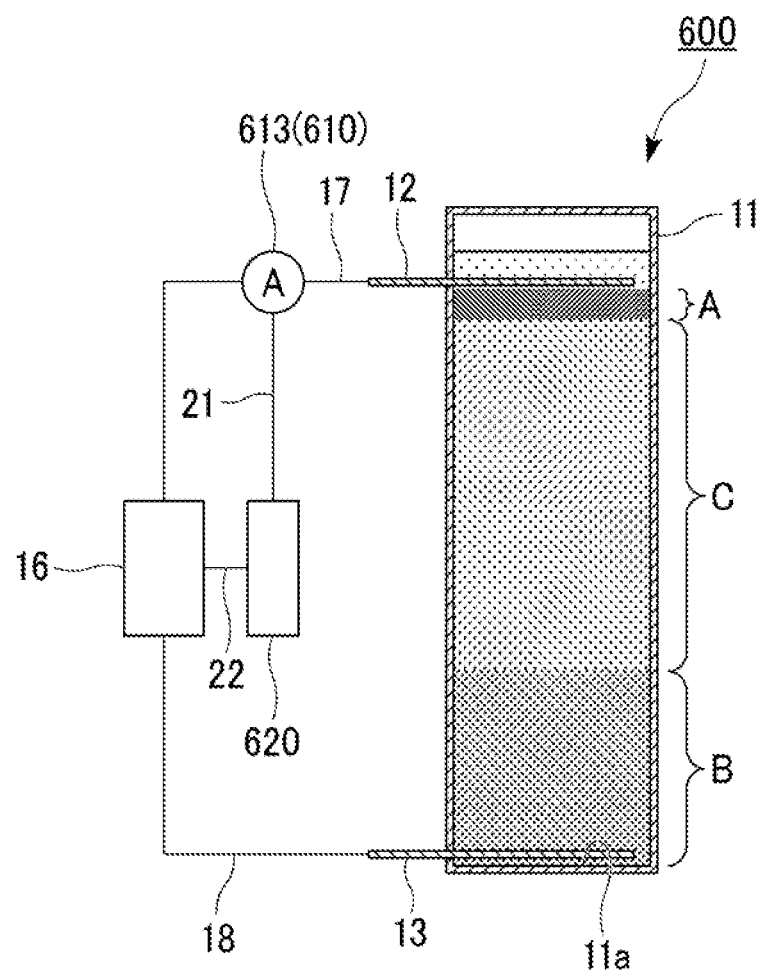
FIG. 15 shows a nanocarbon separation method of the fourth example embodiment.

As shown in FIG. 15, when a direct current voltage is applied to the first electrode 12 and the second electrode 13 while the single-walled carbon nanotube dispersion liquid is accommodated in the separation tank 11, metallic single-walled carbon nanotubes are collected on the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount of metallic single-walled carbon nanotubes and semiconducting single-walled carbon nanotubes is formed between the dispersion liquid phase A and the dispersion liquid phase B.

The determination means 620 receives the electrical signal related to the current value measured by the amperemeter 613, which is transmitted from the evaluation means 610, and determines a separation state of the nanocarbon dispersion liquid 30.

When a value of a current that flows through the first electrode 12 and the second electrode 13 is equal to or less than a predetermined value, the determination means 620 determines that separation of metallic nanocarbons and semiconducting nanocarbons has been completed.

When the determination means 620 determines that separation of metallic nanocarbons and semiconducting nanocarbons has been completed, application of a direct current voltage between the first electrode 12 and the second electrode 13 from the direct current power supply 16 is stopped. That is, the determination means 620 transmits an electrical signal for instructing application of a direct current voltage to be stopped to the direct current power supply 16.

While a case in which the first electrode 12 is a negative electrode and the second electrode 13 is a positive electrode has been provided as an exemplary example of the nanocarbon separation device 600 of the present example embodiment, the nanocarbon separation device 600 of the present example embodiment is not limited thereto. In the nanocarbon separation device 600 of the present example embodiment, the first electrode 12 may be a positive electrode and the second electrode 13 may be a negative electrode.

According the nanocarbon separation device 600 of the present example embodiment, the evaluation means 610 including the amperemeter 613 for measuring a current value between the first electrode 12 and the second electrode 13 in the nanocarbon dispersion liquid 30 during electrophoresis is provided, and the determination means 620 that determines a separation state between metallic nanocarbons and semiconducting nanocarbons contained in the nanocarbon dispersion liquid 30 is provided. Thereby, in a step of separating metallic nanocarbons and semiconducting nanocarbons contained in the nanocarbon dispersion liquid 30, without depending on a method of visually continuing that a dispersion liquid phase has been formed and a time for which a direct current voltage is applied between a pair of electrodes, according to the current value between the first electrode 12 and the second electrode 13 in the nanocarbon dispersion liquid 30, a separation state the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Nanocarbon Separation Method

The nanocarbon separation method of the present example embodiment includes a step of injecting the nanocarbon dispersion liquid 30 into the separation tank 11 (hereinafter referred to as an "injection step"), a step in which a direct current voltage is applied between the first electrode 12 provided at an upper part in the separation tank 11 and the second electrode 13 provided at a lower part in the separation tank 11, metallic nanocarbons contained in the nanocarbon dispersion liquid 30 are caused to move toward the first electrode 12, semiconducting nanocarbons contained in the nanocarbon dispersion liquid 30 are caused to move toward the second electrode 13, and the metallic nanocarbons and the semiconducting nanocarbons are separated (hereinafter referred to as a "separation step"), a step of evaluating a physical state or chemical state of the nanocarbon dispersion liquid 30 (hereinafter referred to as an "evaluation step"), and a step of determining a separation state between metallic nanocarbons and semiconducting nanocarbons contained in the nanocarbon dispersion liquid 30 from the physical state or chemical state of the nanocarbon dispersion liquid 30 (hereinafter referred to as a "determination step").

Working Example 4

While the present invention will be described below in more detail with reference to working examples, the present invention is not limited to the following, working examples.

"Preparation of Single-Walled Carbon Nanotube Dispersion"

In the same manner as in working example 1, a single-walled carbon nanotube dispersion liquid containing an amount of 10 μg/mL of single-walled carbon nanotubes having an average diameter of 1.0 nm synthesized by the eDIPS method and an amount of 1.0 wt % of polyoxyethylene (100) stearyl ether was prepared.

"Injection of Single-Walled Carbon Nanotube Dispersion Liquid"

In the same manner as in working example 1, the single-walled carbon nanotube dispersion liquid prepared as described above was injected into the separation tank 11 of the nanocarbon separation device 600 shown in FIG. 14.

In the nanocarbon separation method of this working example, the evaluation means 610 including the amperemeter 613 for measuring a current value between the first electrode 12 and the second electrode 13 in the nanocarbon dispersion liquid 30 during electrophoresis is provided, and evaluates a current value during electrophoresis.

"Separation Operation"

In the same manner as in working example 1, a direct current voltage of 120 V was applied between the first electrode 12 (negative electrode) and the second electrode 13 (positive electrode) of the nanocarbon separation device 10.

"Evaluation"

Figure 16:
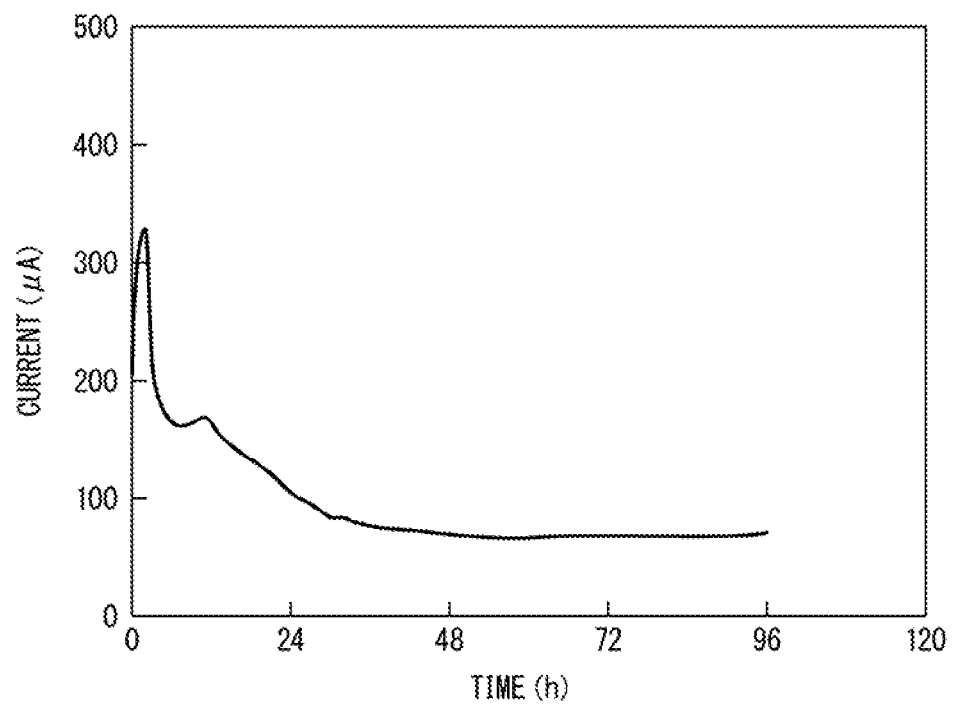
FIG. 16 is a diagram showing evaluation results of a current value between a first electrode and a second electrode in a single-walled carbon nanotube dispersion liquid in working example 4.

When the voltage was applied, a current value during electrophoresis was measured at the same time. FIG. 16 shows the measurement results of the current value during electrophoresis until 96 hours have elapsed. The left vertical axis represents the measured current value during electrophoresis and the horizontal axis represents the voltage application time.

As shown in FIG. 16, immediately after the voltage was applied, a current exceeding 300 µA at the maximum flowed. However, after 24 hours, the current was 100 µA or less, and after 45 hours, it was dropped to 70 µA or less. Thus, it was confirmed that, when electrophoresis proceeded and the amount of substances that moved in the separation tank 11 was reduced, the current value during electrophoresis was reduced. Therefore, it is possible to set a point at which the current value during electrophoresis is sufficiently low as an end point of separation.

In the determination step, when it is determined that separation of metallic single-walled carbon nanotubes and semiconducting single-walled carbon nanotubes has been completed, application of a direct current voltage between the first electrode 12 and the second electrode 13 from the direct current power supply 16 is stopped.

In the state shown in FIG. 16, for example, when the current value during electrophoresis is dropped to 70 µA or less, voltage application during electrophoresis may be stopped. This end point position is able to be changed according to a desired degree of separation as in the case of measuring the potential in working example 1.

Here, the current during electrophoresis changes depending on the voltage to applied, the shape of the separation tank 11, the shape of the first electrode 12 and the second electrode 13, the composition of the nanocarbon dispersion liquid 30, and the like. Therefore, in order to secure reproducibility, it is necessary to match conditions of such a separation operation.

As in this working example, when the state is determined from the current value during electrophoresis based on the current value in electrophoresis, the device configuration is simplest and best, which is advantageous. In addition, the evaluation step and the determination step are able to be performed simultaneously with the separation step, and it is possible to accurately determine an end point of separation of metallic single-walled carbon nanotubes and semiconducting single-walled carbon nanotubes contained in the single-walled carbon nanotube dispersion liquid in real time.

According to the nanocarbon separation device 600 of the present example embodiment, the evaluation means 610 that measures a current value between the first electrode 12 and the second electrode 13 in the separation tank 11 is provided. In addition, when the determination means 620 is provided, a separation state between metallic nanocarbons and semiconducting nanocarbons contained in the nanocarbon dispersion liquid 30 is determined. As a result, in a step of separating nanocarbons, without depending on a method of visually confirming a separation state or a voltage application time for electrophoresis, a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Fifth Example Embodiment

Nanocarbon Separation Device

Figure 17:
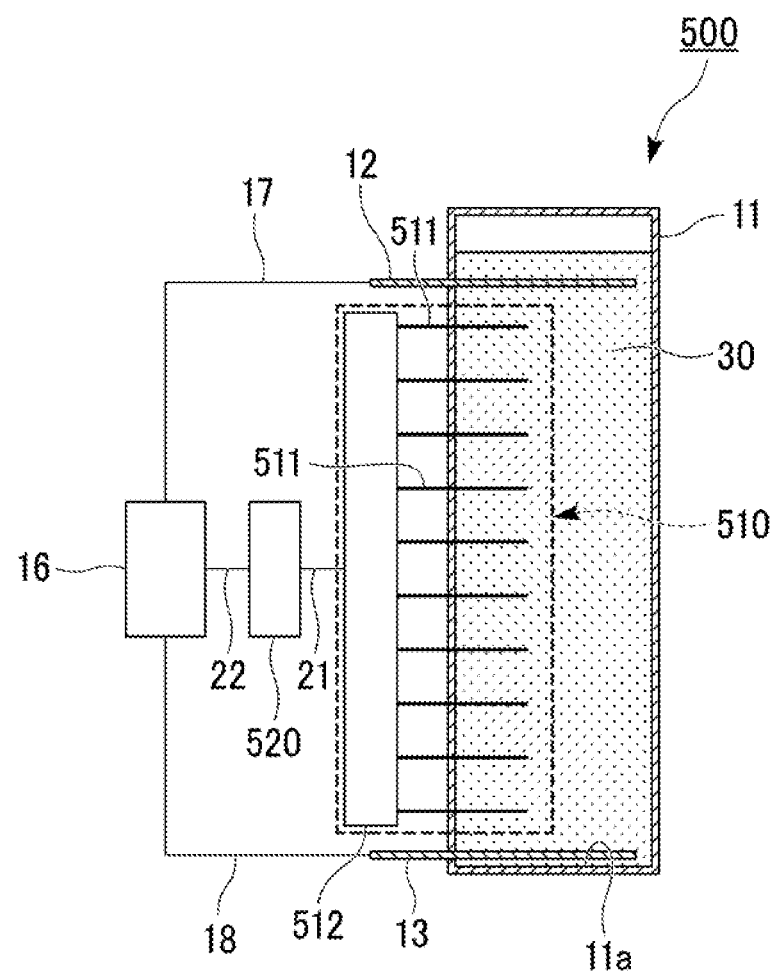
FIG. 17 is a schematic view showing a nanocarbon separation device of a fifth example embodiment.

FIG. 17 is a schematic view showing a nanocarbon separation device of the present example embodiment. The present example embodiment is a modified example of the second example embodiment. Here, in FIG. 17, components the same as those of the nanocarbon separation device of the first example embodiment shown in FIG. 1 will be denoted with the same reference numerals and redundant descriptions will be omitted.

The nanocarbon separation device 500 of the present example embodiment includes the separation tank 11, the first electrode 12 provided at an upper part in the separation tank 11, the second electrode 13 provided at a lower part in the separation tank 11, an evaluation means 510 that evaluates conductivity of the nanocarbon dispersion liquid 30, and a determination means 520 that determines a separation state between metallic nanocarbons and semiconducting nanocarbons contained in the nanocarbon dispersion liquid 30 from the physical state or chemical state of the nanocarbon dispersion liquid 30 evaluated by the evaluation means 510. In addition, the nanocarbon separation device 500 of the present example embodiment may include the direct current power supply 16 that applies a direct current voltage between the first electrode 12 and the second electrode 13. The direct current power supply 16 is electrically connected to the first electrode 12 via the cable 17, and is electrically connected to the second electrode 13 via the cable 18.

A conductivity meter 512 of the evaluation means 510 is electrically connected to the determination means 520 via the cable 21.

In addition, the determination means 520 is electrically connected to the direct current power supply 16 via the cable 22.

An evaluation electrode 511 of the evaluation means 510 is not particularly limited as long as it can be used for carrier-free electrophoresis and is stable with respect to the nanocarbon dispersion liquid 30.

The interval at which the plurality of evaluation electrodes 511 are arranged is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the evaluation electrodes 511 can be arranged only therearound. For example, when an end point of separation is determined based on the physical state or chemical state of the nanocarbon dispersion liquid 30 collected on the lower side of the separation tank 11 after separation, the evaluation electrodes 511 may be arranged on the lower side of the separation tank 11.

Figure 18:
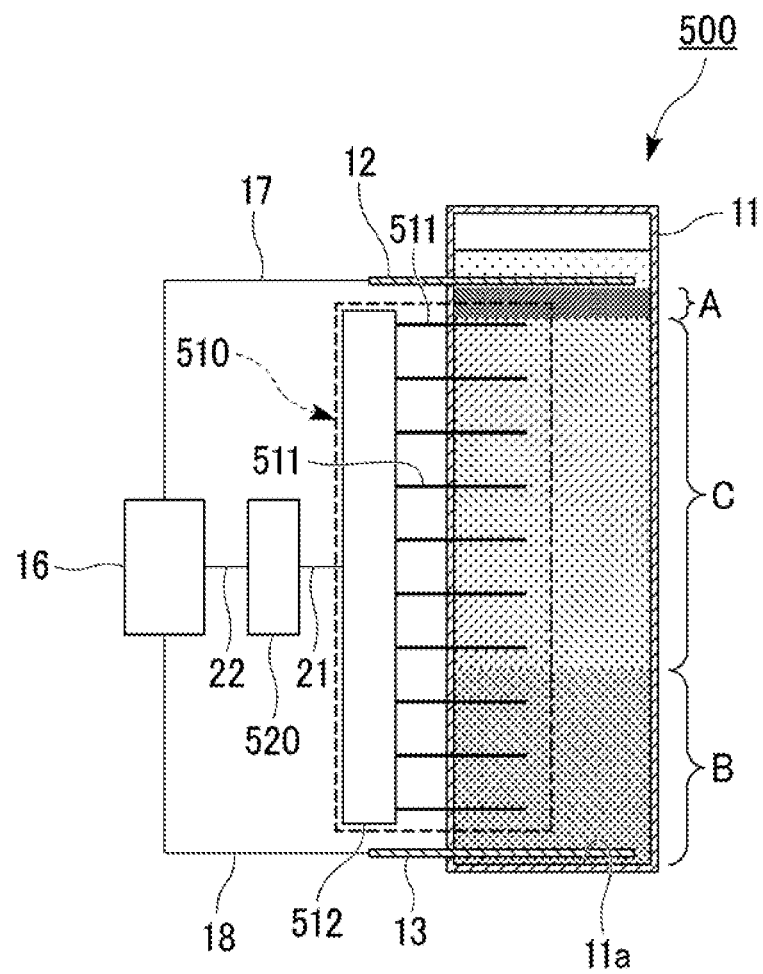
FIG. 18 is a schematic view showing a nanocarbon separation method of the fifth example embodiment.

As shown in FIG. 18, when a direct current voltage is applied to the first electrode 12 and the second electrode 13 while the single-walled carbon nanotube dispersion liquid is accommodated in the separation tank 11, metallic single-walled carbon nanotubes are collected OR the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount if metallic single-walled carbon nanotubes and semiconducting single-walled carbon nanotubes is formed between the dispersion liquid phase A and the dispersion liquid phase B.

The determination means 520 receives the electrical signal related to the conductivity measured by the conductivity meter 512, which is transmitted from the evaluation mans 510, and determines a separation state of the nanocarbon dispersion liquid 30.

When a point at which the amount of change in conductivity changes greatly is equal to or lower than a predetermined measurement positon, the determination means 520 determines that separation of metallic nanocarbons and semiconducting nanocarbons has been completed.

When the determination means 520 determines that separation of metallic nanocarbons and semiconducting nanocarbons has been completed, application of a direct current voltage between the first electrode 12 and the second electrode 13 from the direct current power supply 16 is stopped. That is, the determination means 520 transmits an electrical signal for instructing application of a direct current voltage to be stopped to the direct current power supply 16.

While a case in which the first electrode 12 is a negative electrode and the second electrode 13 is a positive electrode has been provided as an exemplary example of the nanocarbon separation device 500 of the present example embodiment, the nanocarbon separation device 500 of the present example embodiment is not limited thereto. In the nanocarbon separation device 500 of the present example embodiment, the first electrode 12 may be a positive electrode and the second electrode 13 may be a negative electrode.

According to the nanocarbon separation device 500 of the present example embodiment, the evaluation means 510 including the evaluation electrode 511 and the conductivity meter 512 which measure conductivity of the nanocarbon dispersion liquid 30 is provided between the first electrode 12 and the second electrode 13 in the separation tank 11, and the determination means 520 that determines a separation state between metallic nanocarbons and semiconducting nanocarbons contained in the nanocarbon dispersion liquid 30 are provided. Therefore, in a step of separating nanocarbons, without depending on a method of visually confirming that a dispersion liquid phase has been formed or a time for which a direct current voltage is applied between a pair of electrodes, according to the conductivity of the nanocarbon dispersion liquid 30, a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

Sixth Example Embodiment

Nanocarbon Separation Device

Figure 19:
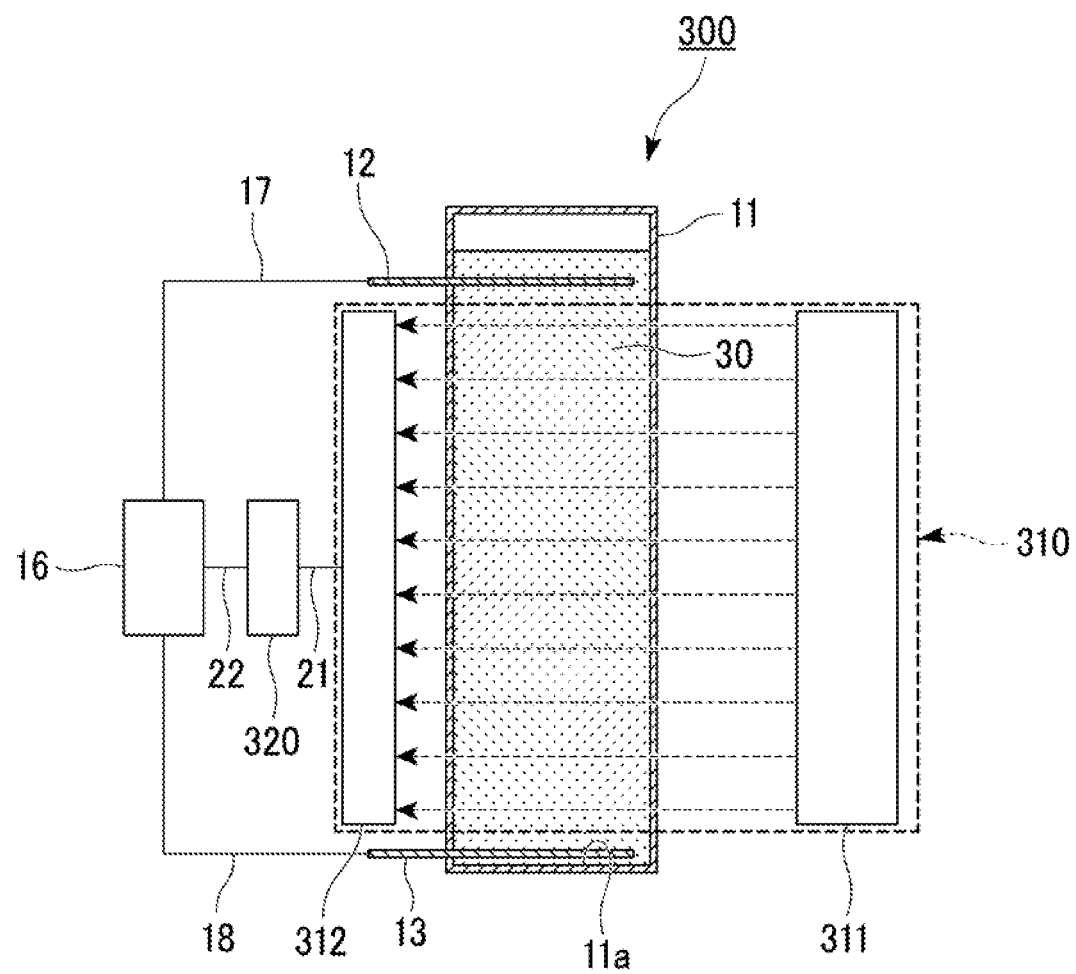
FIG. 19 is a schematic view showing a nanocarbon separation device of a sixth example embodiment.

FIG. 19 is a schematic view showing a nanocarbon separation device of the present example embodiment. The present example embodiment is a modified example of the third example embodiment. In FIG. 9, components the same as those of the nanocarbon separation device of the third example embodiment shown in FIG. 7 will be denoted with the same reference numerals and redundant descriptions will be omitted.

A nanocarbon separation device 300 of the present example embodiment includes the separation tank the first electrode 12 provided at an upper part in the separation tank 11, the second electrode 13 provided at a lower part in the separation tank 11, an evaluation means 310 that evaluates an emission spectrum of the nanocarbon dispersion liquid 30, and a determination means 320 that determines a separation state between metallic nanocarbons and semiconducting nanocarbons contained in the nanocarbon dispersion liquid 30 from the emission spectrum of the nanocarbon dispersion liquid 30 evaluated by the evaluation means 310. In addition, the nanocarbon separation device 300 of the present example embodiment may include the direct current power supply 16 that applies a direct current voltage between the first electrode 12 and the second electrode 13. The direct current power supply 16 is electrically connected to the first electrode 12 via the cable 17 and is electrically connected to the second electrode 13 via the cable 18.

In the nanocarbon separation device 300 of the present example embodiment, the evaluation means 310 includes a light source 311 that emits (irradiates) light to the nanocarbon dispersion liquid 30 accommodated in the separation tank 11 and a detector 312 including a plurality of detecting units that are arranged at equal intervals in the height direction of the separation tank 11. The detecting units of the detector 312 receive, light emitted from the nanocarbon dispersion liquid 30 accommodated in the separation tank 11 when the light is emitted from the light source 311.

The detector 312 of the evaluation means 310 is electrically connected to the determination means 320 via the cable 21.

In addition, the determination means 320 is electrically connected to the direct current power supply 16 via the cable 22.

The light source 311 of the evaluation means 310 excites nanocarbons of the dispersion liquid 30.

Regarding the detector 312 of the evaluation means 310, a detector that is generally used to measure an emission spectrum of a solution is an exemplary example. In addition, the detector 312 can convert a measurement result of the emission spectrum in each detecting unit into an electrical signal and output it to the determination means 320.

In the detector 312, the interval at which the plurality of detecting units are arranged is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the detecting units of the detector 312 can be arranged only therearound. For example, when an end point of separation is determined based on the physical state or chemical state of the nanocarbon dispersion liquid 30 collected on the lower side of the separation tank 11 after separation, the detecting: units of the detector 312 may be arranged on the lower side of the separation tank 11.

Figure 20:
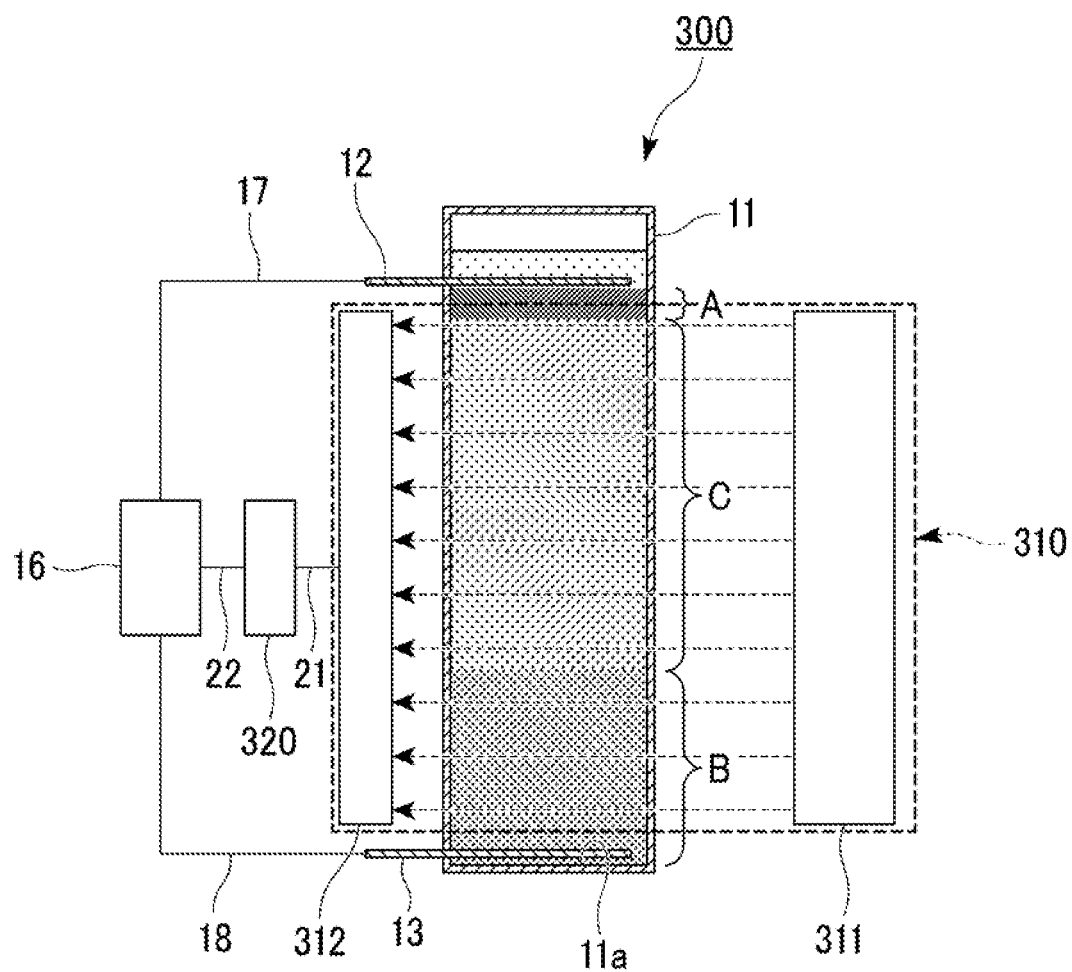
FIG. 20 is a schematic view showing a nanocarbon separation method of the sixth example embodiment.

As shown in FIG. 20, when a direct current voltage is applied to the first electrode 12 and the second electrode 13 while the single-walled carbon nanotube dispersion liquid is accommodated in the separation tank 11, metallic single-walled carbon nanotubes are collected on the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount of metallic single-walled carbon nanotubes and semiconducting single-walled carbon nanotubes is formed between the dispersion liquid phase A and the dispersion liquid phase B.

The determination means 320 receives the electrical signal related to the emission spectrum measured by the detector 312, which is transmitted from the evaluation means 310, and determines a separation state of the nanocarbon dispersion liquid 30.

When a point at which the amount of change in emission spectrum changes greatly is equal to or lower than a predetermined measurement position, the determination means 320 determines that separation of metallic nanocarbons and semiconducting nanocarbons has been completed.

When the determination means 320 determines that separation of metallic nanocarbons and semiconducting nanocarbons has been completed, application of a direct current voltage between the first electrode 12 and the second electrode 13 from the direct current power supply 16 is stopped. That is, the determination means 320 transmits an electrical signal for instructing application of a direct current voltage to be stopped to the direct current power supply 16.

While a case in which the first electrode 12 is a negative electrode and the second electrode 13 is a positive electrode has been provided as an exemplary example of the nanocarbon separation device 300 of the present example embodiment, the nanocarbon separation device 300 of the present example embodiment is not limited thereto. In the nanocarbon separation device 300 of the present example embodiment, the first electrode 12 may be a positive electrode and the second electrode 13 may be a negative electrode.

According to the nanocarbon separation device 300 of the present example embodiment, the evaluation means 310 including the detector 312 that measures an emission spectrum of the nanocarbon dispersion liquid 30 is pre vided between the first electrode 12 and the second electrode 13 in the separation tank 11 and the determination means 320 that determines a separation state between metallic nanocarbons and semiconducting nanocarbons contained in the nanocarbon dispersion liquid 30 is provided. As a result, in step of separating metallic nanocarbons and semiconducting nanocarbons contained in the nanocarbon dispersion liquid 30, without depending on a method of visually confirming, that a dispersion liquid phase has been formed or a time for which a direct current voltage is applied between a pair of electrodes, according to the emission spectrum of the nanocarbon dispersion liquid 30, a separation state of the nanocarbon dispersion liquid 30 can be objectively determined, at end point of separation can be determined, and separation with high accuracy can be realized with favorable reproducibility. In addition, the separation operation can be automated using determination of an accurate end point of separation and the work efficiency can be improved.

Seventh Example Embodiment

Nanocarbon Separation Device

Figure 21:
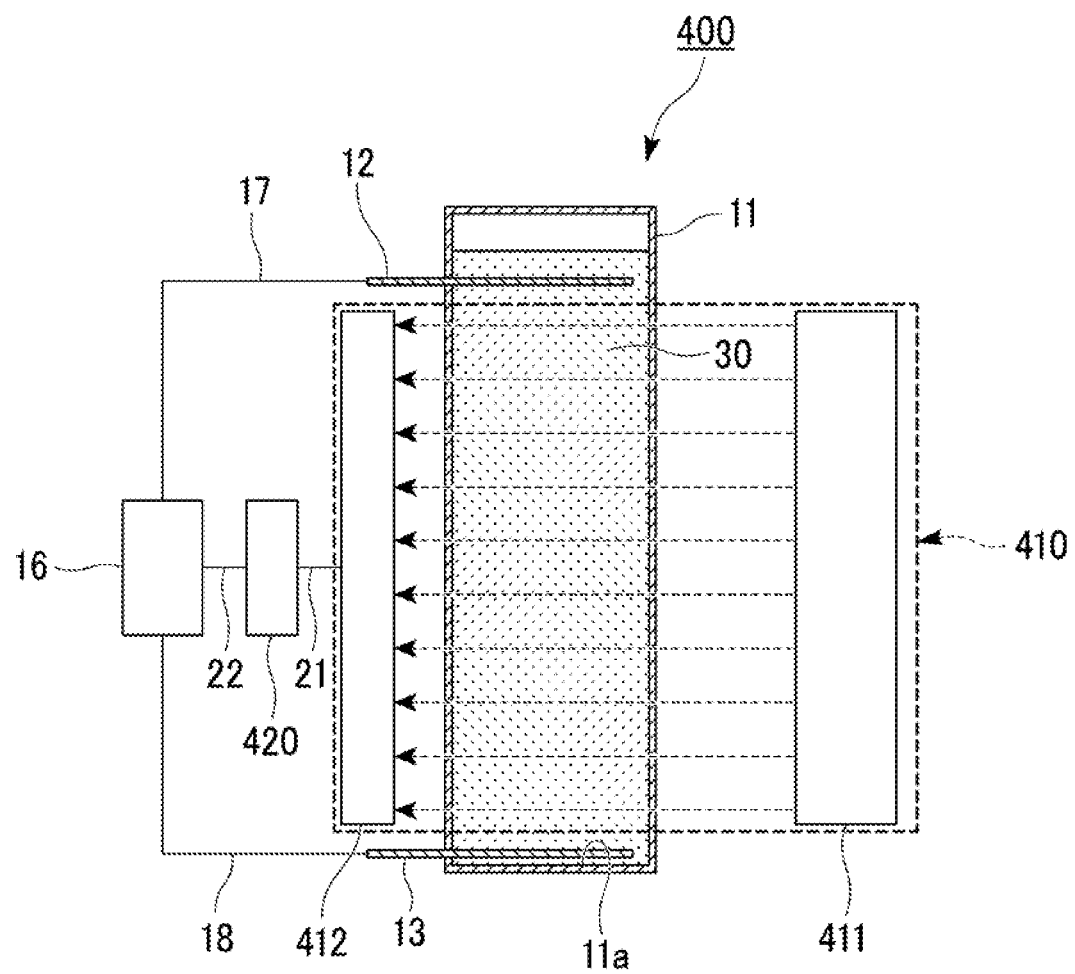
FIG. 21 is a schematic view showing a nanocarbon separation device of a seventh example embodiment.

FIG. 21 is a schematic view showing a nanocarbon separation device of the present example embodiment. The present example embodiment is a modified example of the third example embodiment. In FIG. 21, components the same as those of the nanocarbon separation device of the third example embodiment shown in FIG. 11 will be denoted with the same reference numerals and redundant descriptions will be omitted.

The nanocarbon separation device 400 of the present example embodiment includes the separation tank 11, the first electrode 12 provided at an upper part in the separation tank 11, the second electrode 13 provided at a lower part in the separation tank 11, an evaluation means 410 that evaluates a physical state or chemical state of the nanocarbon dispersion liquid 30, and a determination means 420 that determines a separation state between metallic nanocarbons and semiconducting nanocarbons contained in the nanocarbon dispersion liquid 30 from a refractive index of the nanocarbon dispersion liquid 30 evaluated by the evaluation means 410. In addition, the nanocarbon separation device 400 of the present example embodiment may include the direct current power supply 16 that applies a direct current voltage between the first electrode 12 and the second electrode 13. The direct current power supply 16 is electrically connected to the first electrode 12 via the cable 17 and is electrically connected to the second electrode 13 via the cable 18.

In the nanocarbon separation device 400 of the present example embodiment, the evaluation means 410 includes a light source 411 that emits (irradiates) light to the nanocarbon dispersion liquid 30 accommodated in the separation tank 11 and a detector 412 including a plurality of detecting units that are arranged at equal intervals in the height direction of the separation tank 11. The detecting units of the detector 412 receive light that is emitted from the light source 411 and has passed through the nanocarbon dispersion liquid 30 accommodated in the separation tank 11 and measure a refractive index.

The detector 412 of the evaluation means 410 is electrically connected to the determination means 420 via the cable 21.

In addition, the determination means 420 is electrically connected to the direct current power supply 16 via the cable 22.

Regarding the detector 412 of the evaluation means 410, a detector that is generally used to measure a refractive index of a solution is an exemplary example. In addition, the detector 412 can convert a measurement result of the refractive index in each detecting means into an electrical signal and output it to the determination means 420.

In the detector 412, the interval at which the plurality of detecting units are arranged is not particularly limited, and is appropriately adjusted according to the height of the separation tank 11, the amount (volume) of the nanocarbon dispersion liquid 30 accommodated in the separation tank 11, or the like. When the separation is completed, if a position of the nanocarbon dispersion liquid 30 to be noted is known in advance, the detecting units of the detector 412 can be arranged only therearound. For example, when an end point of separation is determined based on the physical state or chemical state of the nanocarbon dispersion liquid 30 collected on the lower side of the separation tank 11 after separation, the detecting units of the detector 412 may be arranged on the lower side of the separation tank 11.

Figure 22:
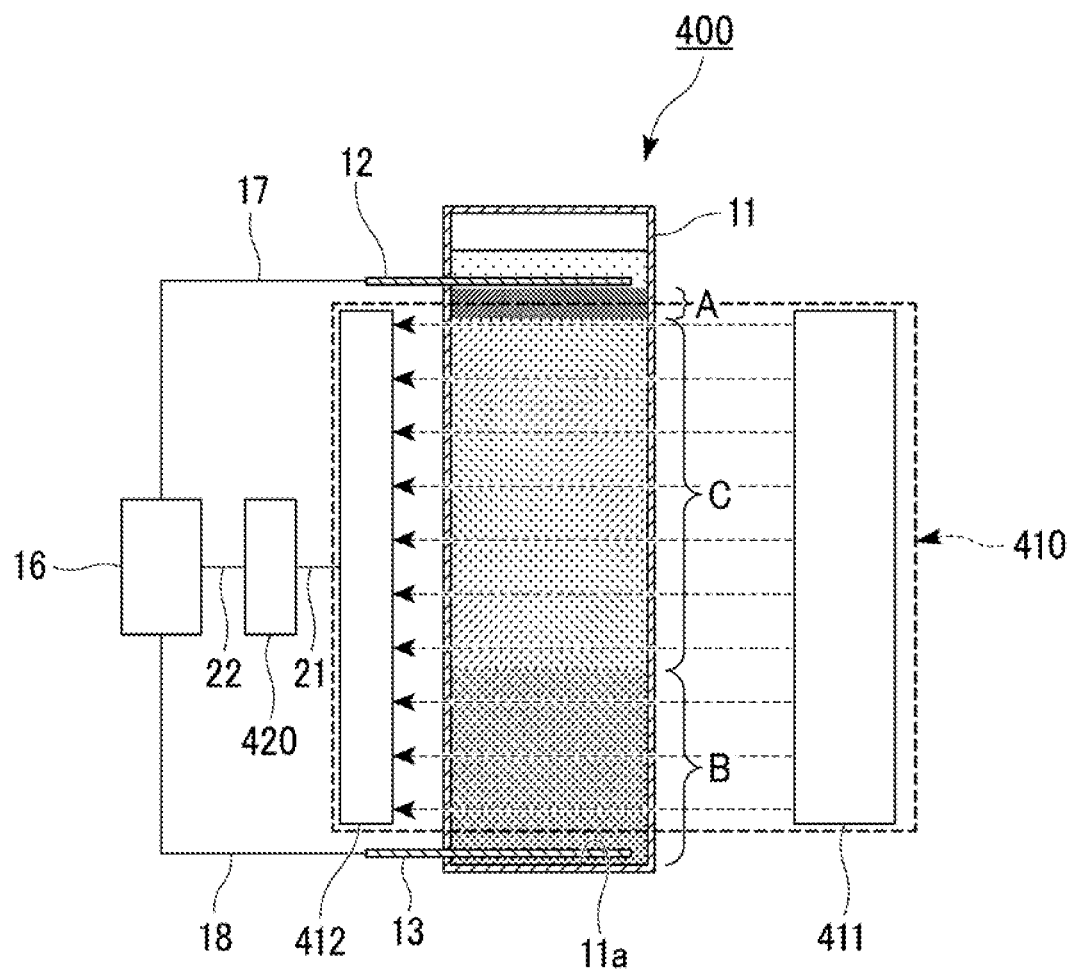
FIG. 22 is a schematic view showing a nanocarbon separation method of the seventh example embodiment.

As shown in FIG. 22, when a direct, current voltage is applied to the first electrode 12 and the second electrode 13 while the single walled carbon nanotube dispersion liquid is accommodated in the separation tank 11, metallic single-walled carbon nanotubes are collected on the side of the first electrode 12 (negative electrode) to form the dispersion liquid phase A. In addition, semiconducting single-walled carbon nanotubes are collected on the side of the second electrode 13 (positive electrode) to form the dispersion liquid phase B. In addition, the dispersion liquid phase C having a relatively small amount of metallic single-walled, carbon nanotubes and semiconducting single-walled carbon nanotubes is formed between the dispersion liquid phase A and the dispersion liquid phase B.

The determination means 420 receives the electrical signal related to the refractive index measured by the detector 412, which is transmitted from the evaluation means 410, and determines a separation state of the nanocarbon dispersion liquid 30.

When a point at which the amount of change in refractive index changes greatly is equal to or lower than a predetermined measurement position, the determination means 420 determines that separation of metallic nanocarbons and semiconducting nanocarbons has been completed.

When the determination means 420 determines that separation of metallic nanocarbons and semiconducting nanocarbons has been completed, application of a direct current voltage between the first electrode 12 and the second electrode 13 from the direct current power supply 16 is stopped. That is, the determination means 420 transmits an electrical signal for instructing application of a direct current voltage to be stopped to the direct current power supply 16.

As in the first example embodiment, the nanocarbon separation device 400 of the present example embodiment preferably includes a temperature-adjusting means for keeping the temperature of the nanocarbon dispersion liquid 30 in the separation tank 11 constant.

While a case in which the first electrode 12 is a negative electrode and the second electrode 13 is a positive electrode has been provided as an exemplary example of the nanocarbon separation device 400 of the present example embodiment, the nanocarbon separation device 400 of the present example embodiment is not limited thereto. In the nanocarbon separation device 400 of the present example embodiment, the: first electrode 12 may be a positive electrode and the second electrode 13 may be a negative electrode, According to the nanocarbon separation device 400 of the present example embodiment, the evaluation means 410 including the detector 412 which measures a refractive index of the nanocarbon dispersion liquid 30 is provided between the first electrode 12 and the second electrode 13 in the separation tank 11, and the determination, means 420 that determines a separation state between metallic nanocarbons and semiconducting nanocarbons contained in the nanocarbon dispersion liquid 30 is provided. As a result, in a step of separating metallic nanocarbons and semiconducting nanocarbons contained in the nanocarbon dispersion liquid 30, without depending on a method of visually confirming that a dispersion liquid phase has been formed or a time for which a direct current voltage is applied between a pair of electrodes, according to the refractive index of the nanocarbon dispersion liquid 30, a separation state of the nanocarbon dispersion liquid 30 can be objectively determined, an accurate end point of separation can be determined, and separation with high accuracy can be realized with favorable reproducibility. In addition, the separation operation can be automated using determination of an accurate end point of separation and the work efficiency can be improved.

While a ease in which the nanocarbon separation device includes, as the evaluation means, one means selected from the group consisting of the means that measures a potential of the nanocarbon dispersion liquid, the means that measures a pH of the nanocarbon dispersion liquid, the means that measures the absorbance of the nanocarbon dispersion liquid, the means that measures a current value between the first electrode and the second electrode, the means that measures the conductivity of the nanocarbon dispersion liquid, the means that measures the emission spectrum of the nanocarbon dispersion liquid, and the means that measures the refractive index of the nanocarbon dispersion liquid has been provided as an exemplary example of the above example embodiments and working examples of the present invention, the present invention is not limited thereto. The present invention may include, as the evaluation means, two or more means selected from the group consisting of the means that measures a potential of the nanocarbon dispersion liquid, the means that measures a pH of the nanocarbon dispersion liquid, the means that measures the absorbance of the nanocarbon dispersion liquid, the means that measures a current value between the first electrode and the second electrode, the means that measures the conductivity of the nanocarbon dispersion liquid, the means that measures the emission spectrum of the nanocarbon dispersion liquid, and the means that measures the refractive index of the nanocarbon dispersion liquid.

While a case in which, in the nanocarbon separation method, in the evaluation step, a separation state of the nanocarbon dispersion liquid is evaluated according to one selected from the group consisting of the potential of the nanocarbon dispersion liquid, a pH of the nanocarbon dispersion liquid, the absorbance of the nanocarbon dispersion liquid, a current value between the first electrode and the second electrode, the conductivity of the nanocarbon dispersion liquid, the emission spectrum of the nanocarbon dispersion liquid, and the refractive index of the nanocarbon dispersion liquid has been provided as an exemplary example of the above example embodiments and working examples of the present invention, the present invention is not limited thereto. In the present invention, in the nanocarbon separation method, in the evaluation step, a separation state of the nanocarbon dispersion liquid may be evaluated according to two or more selected from the group consisting of the potential of the nanocarbon dispersion liquid, a pH of the nanocarbon dispersion liquid, the absorbance of the nanocarbon dispersion liquid, a current value between the first electrode and the second electrode, the conductivity of the nanocarbon dispersion liquid, the emission spectrum of the nanocarbon dispersion liquid, and the refractive index of the nanocarbon dispersion liquid.

While the example embodiments that can be applied when the mixture of single-walled carbon nanotubes is separated into metallic single-wailed carbon nanotubes and semiconducting single-walled carbon nanotubes have been described above, the present invention can be applied also for separation of a mixture of multi-walled carbon nanotubes, a mixture of two-walled carbon nanotubes, a mixture of graphene, and the like.

REFERENCE SYMBOLS

10, 100, 200. 300, 400, 500, 600 Nanocarbon separation device
11 Separation tank
12 First electrode
13 Second electrode
14, 110, 210, 310, 410, 510, 610 Evaluation means
15, 120, 220, 320, 420, 520, 620 Determination means
16 direct current Power supply
17 18, 21, 22 Cable
19, 511 Evaluation electrode
20 Potentiometer
30 Nanocarbon dispersion liquid
111 pH sensor
112 pH meter 211, 311, 411 Light source
212, 312, 412 Detector
512 Conductivity meter
611 First evaluation electrode
612 Second evaluation electrode
613 Amperemeter

The invention claimed is:

1. A nanocarbon separation device, comprising:
a separation tank that is configured to accommodate a dispersion liquid including nanocarbons;
a first electrode that is provided at an upper part in the separation tank;
a second electrode that is provided at a lower part in the separation tank;
an evaluation unit that is configured to evaluate a physical state or a chemical state of the dispersion liquid at a plurality of measurement positions in the separation tank; and
a determination unit that is configured to determine a separation state between metallic nanocarbons and semiconducting nanocarbons included in the dispersion liquid from the physical state or the chemical state,
wherein the plurality of measurement positions are arranged in a height direction of the separation tank.

2. The nanocarbon separation device according to claim 1, wherein the evaluation unit is at least one of a unit that is configured to measure a potential of the dispersion liquid, a unit that is configured to measure a pH of the dispersion liquid, a unit that is configured to measure an absorbance of the dispersion liquid, a unit that is configured to measure an emission spectrum of the dispersion liquid, a unit that is configured to measure a refractive index of the dispersion liquid, a unit that is configured to measure a conductivity of the dispersion liquid, and a unit that is configured to measure a current value between the first electrode and the second electrode.

3. The nanocarbon separation method according to claim 1,
wherein the dispersion liquid includes a polyoxyethylene alkyl ether represented by the following formula as a non-ionic surfactant:

$C_nH_{2n}(OCH_2CH_2)_mOH$ here, n=12 to 18, m=20 to 100.

4. The nanocarbon separation device according to claim 1,
wherein the determination unit is configured to determine that a separation of the metallic nanocarbons and the semiconducting nanocarbons has been completed.

5. The nanocarbon separation device according to claim 4,
wherein the determination unit is configured to determine that the separation has been completed when a measurement position at which a gradient of the physical state or the chemical state changes greatly becomes equal to or lower than a predetermined measurement position.

6. A nanocarbon separation method, comprising:
injecting a dispersion liquid including nanocarbons into a separation tank;
separating the metallic nanocarbons and the semiconducting nanocarbons by applying a direct current voltage between a first electrode provided at an upper part in the separation tank and a second electrode provided at a lower part in the separation tank, to cause metallic nanocarbons included in the dispersion liquid to move toward the first electrode, and to cause semiconducting nanocarbons included in the dispersion liquid to move toward the second electrode;
evaluating a physical state or a chemical state of the dispersion liquid at a plurality of measurement positions in the separation tank; and
determining a separation state of the metallic nanocarbons and the semiconducting nanocarbons from the physical state or the chemical state,
wherein the plurality of measurement positions are arranged in a height direction of the separation tank.

7. The nanocarbon separation method according to claim 6,
wherein, in the evaluating the physical state or the chemical state, a separation state of the dispersion liquid is evaluated according to at least one of a potential of the dispersion liquid, a pH of the dispersion liquid, an absorbance of the dispersion liquid, an emission spectrum of the dispersion liquid, a refractive index of the dispersion liquid, a conductivity of the dispersion liquid and a current value between the first electrode and the second electrode.

8. The nanocarbon separation method according to claim 6, comprising
recovering the metallic nanocarbons and the semiconducting nanocarbons included in the dispersion liquid after the separating the metallic nanocarbons and the semiconducting nanocarbons.

9. The nanocarbon separation method according to claim 6,
wherein the nanocarbons are single-walled carbon nanotubes.

* * * * *